US011868956B1

(12) United States Patent
Dillon et al.

(10) Patent No.: US 11,868,956 B1
(45) Date of Patent: Jan. 9, 2024

(54) SESSION-BASED ANALYSIS OF EVENTS

(71) Applicant: Amazon Technologies, Inc., Seattle, WA (US)

(72) Inventors: Michael Dillon, Seattle, WA (US); Charles Winn Degranville, Seattle, WA (US); Paul Aksenti Savastinuk, Bainbridge Island, WA (US); Amit Dekate, Medina, WA (US); Michael L Sandige, Sammamish, WA (US); Scott Brown, Seattle, WA (US); Paul Eugene Munger, Seattle, WA (US); Matthew Scott Wilding, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 706 days.

(21) Appl. No.: 16/455,401

(22) Filed: Jun. 27, 2019

(51) Int. Cl.
*G06Q 10/087* (2023.01)
*G06F 17/18* (2006.01)
*G06F 9/54* (2006.01)

(52) U.S. Cl.
CPC ......... *G06Q 10/087* (2013.01); *G06F 9/542* (2013.01); *G06F 17/18* (2013.01); *G06F 2218/00* (2023.01)

(58) Field of Classification Search
CPC ....... G06Q 10/087; G06F 9/542; G06F 17/18; G06K 9/00496
USPC .......................................................... 705/28
See application file for complete search history.

(56) References Cited

U.S. PATENT DOCUMENTS

| 9,117,106 | B2 | 8/2015 | Dedeoglu et al. | |
|---|---|---|---|---|
| 9,235,928 | B2 | 1/2016 | Medioni et al. | |
| 9,473,747 | B2 | 10/2016 | Kobres et al. | |
| 2013/0284806 | A1 | 10/2013 | Margalit | |
| 2014/0379296 | A1* | 12/2014 | Nathan | G06V 10/811 702/150 |
| 2016/0110622 | A1* | 4/2016 | Herring | G06Q 30/016 382/103 |

(Continued)

OTHER PUBLICATIONS

Qolomany, Basheer Mohammed Basheer. Efficacy of Deep Learning in Support of Smart Services. Western Michigan University ProQuest Dissertations Publishing, 2018. (Year: 2018).*

(Continued)

*Primary Examiner* — Nathan C Uber
*Assistant Examiner* — Fawaad Haider
(74) *Attorney, Agent, or Firm* — Lee & Hayes, P.C.

(57) ABSTRACT

Systems and techniques for detecting events involving a user that occurred during a session in a facility, and performing a holistic, session-based analysis of the events to determine items taken by the user from the facility. An inventory management system may initially analyze the events to determine a hypothesis for a result of each respective event and a probability that the hypotheses are accurate. An initial listing of the items determined to be taken by the user may be generated along with probabilities that the items were taken. Upon determining that a probability an item was taken is lower than a threshold, the management system may select an algorithm to process an event in the session that is likely to resolve uncertainty in the initial listing. The management system may iteratively process events until a final listing represents the items taken by the user with an allowable probability.

18 Claims, 10 Drawing Sheets

(56) References Cited

U.S. PATENT DOCUMENTS

2019/0164313 A1* 5/2019 Ma .................. G06V 10/44

OTHER PUBLICATIONS

Selvadurai, John. Distributed Computing in Internet of Things (IoT) Using Mobile Ad Hoc Network (MANET): A Swarm Intelligence Based Approach. Indiana State University ProQuest Dissertations Publishing, 2017. (Year: 2017).*

* cited by examiner

SESSION-BASED ANALYSIS OF EVENTS

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, and packed and shipped to the customer. Likewise, physical stores maintain inventory in customer accessible areas, such as in a shopping area, and customers can pick items from inventory and take them to a cashier for purchase, rental, and so forth. Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and the like. In each instance, for an item to be moved from one location to another, the item is picked from its current location and transitioned to a new location, users may move about within the facility, and so forth. It is often desirable to generate information about events occurring in the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
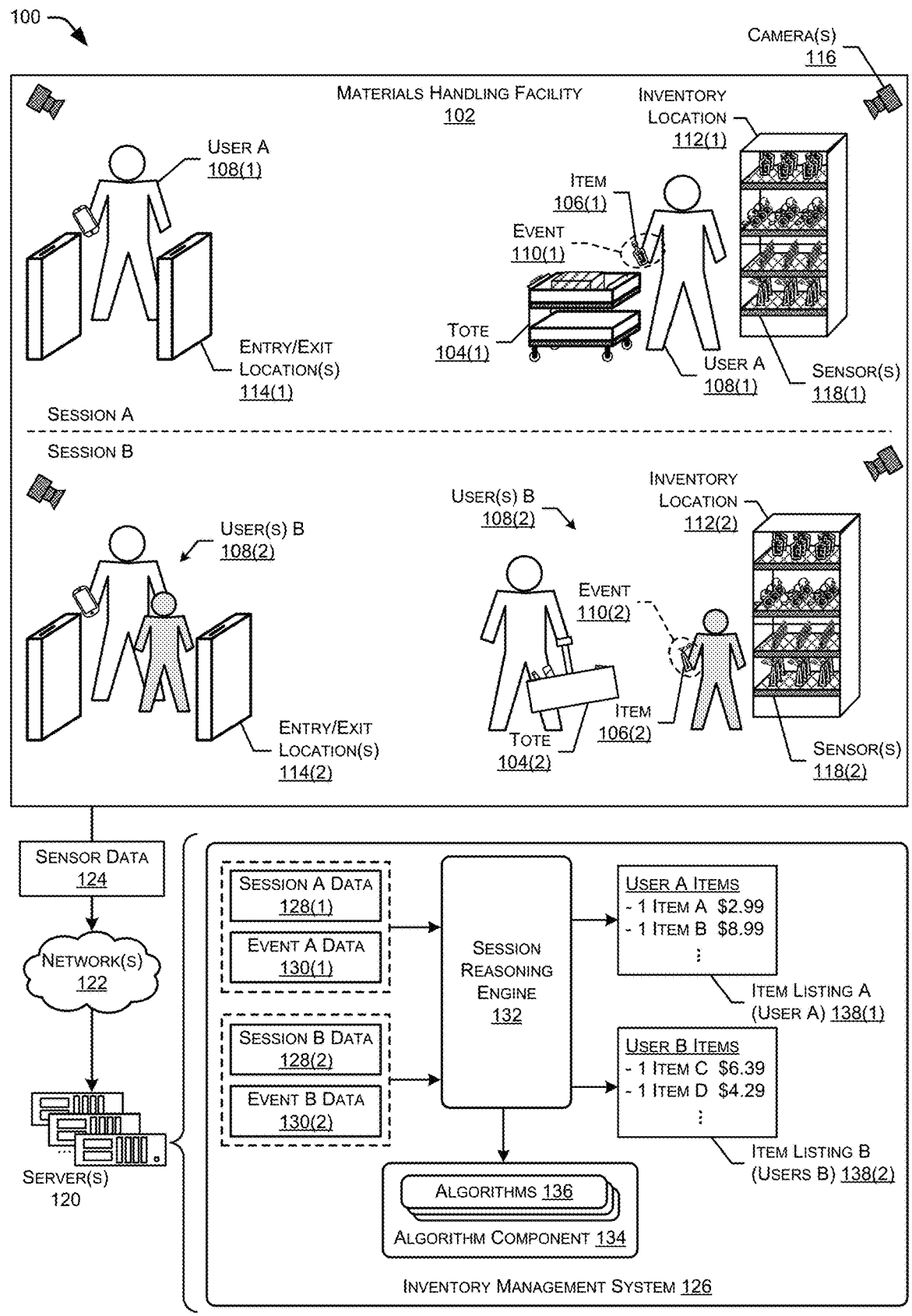
FIG. 1 illustrates an example environment of a materials handling facility that includes one or more sensors to generate sensor data for use in identifying one or more events that occur within the facility, such as a user picking an item from an inventory location in the facility. The facility may be associated with an inventory management system that performs session-based analysis of events for sessions of users in the facility.

This disclosure describes systems and techniques for detecting events involving a user that occurred during a session in a materials handling facility (or "facility"), and performing a holistic, session-based analysis of the events to determine items taken by the user from the facility. The facility may include, or have access to, an inventory management system. The inventory management system may initially analyze the events to determine a hypothesis for a result of each respective event along with a probability that the hypothesis is accurate. Using these hypotheses and probabilities, an initial listing of the items (e.g., a receipt for the session) that were determined to be taken from the facility by the user may be generated along with probabilities that the items were taken. If the inventory management system determines that a probability that an item was taken is lower than a threshold, the inventory management system may select an algorithm to further process an event in the session that is likely to resolve ambiguity or uncertainty in the initial listing of the items. The inventory management system may iteratively process events until a final listing of the items represents the items taken from the facility by the user with an allowable confidence or probability. The final listing of the items may then be stored in association with an account or profile of the user.

As described herein, operation of the inventory management system may be supported by sensor data acquired by one or more sensors. The sensor data may include image data acquired by imaging devices such as cameras, weight sensors, information acquired from radio frequency tags, and so forth.

The inventory management system may determine, using the sensor data, occurrences of one or more "events" within the facility. Events may involve interactions between one or more items, inventory locations, users, totes, robots, changes in sensor operation, movement of objects, and so forth. For example, a user may remove an item from an inventory location, such as a shelf. In another example, two or more users may move past one another or attempt to access the same inventory location contemporaneously.

The inventory management system may be configured to maintain information about items, users, condition of the facility, and so forth. For example, the inventory management system may maintain data indicative of a result of different events that occur within the facility, such as what items a particular user is ordered to pick, location of the particular user, availability of a user providing support services to others, taking of items by user from inventory locations, returns of items to inventory locations, environmental status of the facility, and so forth. As such, as used herein a "result" of an event may comprise data representing some inference regarding the event, which may represent a particular value, indication that the event is inconclusive, or the like. That is, the result of an event may comprise any information deduced from automated or manual analysis of sensor data at least partly representative of the event. Further, it is to be appreciated that analysis of first data associated with an event may produce a first result. However, analysis of second data associated with the same event may produce a second result. Further, because these results are essentially calculated hypotheses of what the actual real-world result of the event was, the produced results may differ from one another and, potentially, from the real-world result of the real-world event.

Generally, a "session" of a user in the facility may include all the events that happen that might affect a listing of items of the user and occur from when the user, or group of users (e.g., a child with their parent), enter the facility to when the user exits the facility. For instance, the inventory management system may be automated to automatically identify the user when they enter the building (e.g., facial recognition, voice recognition, scanning of a user identifier on a phone or badge, etc.), identify the user when they exit the building, and identify locations and events involving the user that may affect the listing of items taken by the user.

In some examples, the inventory management system may be automated to provide the output data during the session. For example, the inventory management system may automatically identify an item removed from an inventory location as well as a user that removed the item. In response, the inventory management system may automatically update a virtual shopping cart of that particular user as the user is still engaged in the session. Accordingly, the inventory management system may update a virtual shopping cart of a user, or another virtual listing, in real-time or near real-time as events occur in a serialized manner. While it may be advantageous to notify the user of a current state of the virtual cart, it can also be disadvantageous for the inventory management system to attempt to determine results for events in a serialized manner, and in real-time or near real-time.

For example, the inventory management system may need to understand or determine a full state of results of the events in the facility before making an inference about the next event that occurs. However, this dependency relationship may cause issues with processing of events, such as in scenarios where a particular user or event is difficult to resolve and requires further processing or human intervention. In such scenarios, the inventory management system may be hindered from maintaining a state of the facility and the items taken by the users therein due to one or more events that are difficult to resolve. Additionally, when using a serialized or dependency-based analysis, future events are unusable to determine results for events when they occur. As an example, an item may have been taken from an inventory location by a user, and the inventory management system may be unable to determine what item was taken. However, a future event may include the user returning the item to the inventory location such that the inventory management system was able to identify the item when it was returned. In a system where results are determined in a dependent or serialized fashion, the inventory management system may have to use substantial computing resources to run algorithms to resolve the first event of the user taking the item. However, if the future return event was able to be taken into account for the session of the user, the inventory management system would be able to match the take and return events with less processing requirements and determine results for both events.

Accordingly, the techniques described herein include a session-based analysis of events involving the user after the user has finished their session in the facility. The inventory management system may receive data for all of the events in the session of the user, and process the events such that analysis for sessions of different users are decoupled from each other. The inventory management system may determine, for the session of the user, a finalize listing of the items taken by the user, as well as the quantity of the items taken, and may further store the listing of the items in an account of the user (e.g., a receipt to charge the user for the items taken).

The inventory management system may initially analyze the sensor data obtained or generated by sensors in the facility to generate output data that provides information indicative of the events in a session involving a user. For example, the inventory management system may process the sensor data to determine the occurrence of the events in the facility involving the user, and determine an initial hypothesis for a result of each respective event along with a confidence value indicating an estimation of accuracy of the hypothesis for each event (e.g., 90% confidence the result is accurate). Using these initial hypotheses for results of the events along with the confidence values, the inventory management may generate an initial probabilistic listing of the items determined to be taken by the user during the session.

The probabilistic listing of the items may quantify uncertainty by including line-by-line indications of the items determined to be taken (e.g., textual item identifiers) along with probabilities for quantities of the items determined to be taken. For example, one of the lined items may be "apple/quantity 0 (0.3)/quantity 1 (0.5)/quantity 2 (0.2)" where the probabilities for the different quantities of the item "apple" all sum to "1." The inventory management system may analyze each line item and determine whether the probabilistic listing of items is acceptable, or if further processing of the events is needed to remove uncertainty in the probabilistic listing (e.g., if a probability score for an item is lower than some defined threshold).

Upon determining that the probabilistic listing of items is unacceptable due to uncertainty in an item and/or quantity of the item, the inventory management system may determine which event, from all the events in the session with low confidence values, will provide the most information if processed further. For instance, the inventory management system may determine that a particular event associated with the item with low probability values may be most advantageous to process further to determine a result with a higher confidence.

After determining an event from the session to process further to resolve uncertainty in the probabilistic receipt, the inventory management system may select a particular algorithm to utilize to process the selected event further. In some examples, the algorithm may be selected from a group of algorithms based on an expected information gain for executing the algorithm being higher than expected information gains for executing the other algorithms to analyze the event. For example, if the event was initially processed using a vision-based algorithm where image data depicting the item was processed to identify the item, the inventory management system may select a weight-based algorithm for the event. For instance, the inventory management system may select an algorithm that analyzes weight data generated by a load cell in an inventory location associated with an item involved in the event to determine, with a higher confidence value, a result for the event that previously had a low confidence value.

After processing the event with the low confidence value with the selected algorithm to determine a result with a higher confidence value, the inventory management system may re-compute the probabilistic session receipt using updated hypothesis and/or updated confidence values for the events in the session. The inventory management system may then analyze each line item in the updated probabilistic listing and determine whether the probabilistic listing of items is acceptable after re-processing the event, or if further processing of the events is needed to remove uncertainty in the updated probabilistic listing. The inventory management system may iteratively process events with low confidence values as described above until a final probabilistic listing of the items taken by the user is determined to be acceptable (e.g., probability values for each line item are greater than the threshold).

Upon determining that a finalized probabilistic listing is acceptable with respect to uncertainty for the items and quantity of the items, the inventory management system may output the finalized probabilistic listing and close the session for the user that was being analyzed. The finalized probabilistic listing may, in some examples, be stored or associated with a user account. In examples where the session is a shopping session, a payment instrument of the user account may be charged for the cost of the items determined to be taken by the user during the session.

The systems and techniques described herein for session-based analysis of events in a facility provide various improvements and efficiencies for an inventory management system. The inventory management system may more intelligently analyze events in a session by looking at all the events holistically, rather than in a serialized fashion as the events occur. For instance, the inventory management system may resolve low-confidence results for events occurring earlier in a session using high-confidence results for events occurring later in a session (e.g., a high-confidence "return" event may resolve a low confidence "take" event that occurred earlier in the session). Further, the inventory management system may be able to decouple sessions for different users from each other such that the events in different sessions are not dependent on each other, which may reduce latency in the inventory management system. For example, a particular event may involve two different users such that the event is included in two sessions for the two different users. In such an example, the inventory management system may still process each session independently as the sessions are decoupled, which may reduce latency in the processing of events and sessions by the inventory management system.

The techniques may be performed by one or more backend devices or servers associated with the facility. For instance, the sensor data and/or image data may be collected by sensors in the facility and sent over network(s) to backend devices at the facility, or server devices located remote from the facility, to be processed remotely. Further, while various techniques described below are with reference to purchasing items in a retail facility, the techniques are generally applicable to any materials handling facility in which a user may take items from the facility or move items around the facility. For example, although the techniques described herein are primarily with reference to identifying items taken by a user for the purpose of identifying a user account to charge for items selected from a materials handling facility, the techniques are equally applicable to any industry in which user recognition may be helpful. For instance, the idem-identifying tote may be implemented for distribution centers where employees collect items from various locations to be shipped through the mail system.

Although the techniques described herein are with reference to a session of a user in a materials handling facility, the techniques are generally applicable to any item-recognition environment. Other examples may include inventory-management systems automating the intake of new shipments of item inventory, libraries for processing returned books and/or identifying books obtained by a user during a library session, video-rental facilities for processing and sorting returned movies, and so forth.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 of a materials handling facility 102 (or "facility") that includes a tote 104 in which items 106 may be placed by one or more users 108. The facility 102 may include one or more sensors to generate sensor data for use in identifying one or more events 110 that occur within the facility 102, such as a user 108 picking an item 106 from an inventory location 112 (e.g., shelf) in the facility 102. The facility 102 may be associated with an inventory management system that performs session-based analysis of events 110 for sessions of users 108 in the facility 102. In some examples, the inventory management system resides remotely from the facility 102 while in other instances some or all of the inventory management system resides within or proximate to the facility 102. As FIG. 1 depicts, in the illustrated example a user 106 picks an item 106 from a shelf 112 in the facility 102. For example, the shelf 112 may house one or more different types of items and the user 106 may pick (i.e., take) one of these items.

In some examples, the facility 102 includes one or more entry/exit locations 114 (e.g., gates) which users 108 pass through when entering or exiting the facility 102. The gates 114 may include one or more sensors to determine which customer is entering or exiting the facility 102. For example, the gates 114 may have a sensor to detect an RFID tag for a computing device of a user 108 entering or exiting the facility 102, or may have a scanner which reads information (e.g., barcode) off a computing device of a user 108 to identify the user. In some instances, the facility 102 may also include one or more cameras (e.g., overhead cameras) for generating image data for identifying users entering and exiting the store. For instance, the camera data may be used as an alternative to, or to supplement, any sensor data acquired at the gate 114 itself (e.g., from an RFID reader, a scanner, etc.).

The facility 102 may further have various sensors disposed within which track the movements of the users 108 and monitor the user 108 interactions with the items 106 at the various inventory locations 112. For example, the facility 102 may include one or more cameras 116 (or other imaging sensors) to take images or videos as the users 108 move about the facility 102 and interact with items 106 in the facility 102. In some examples, the cameras 116 may continuously monitor respective regions of the facility 102. For instance, a set of cameras 116 may be assigned to record videos of a specific inventory location 112 from various angles and viewpoints. In some examples, the cameras 116 may take pictures of users 108 and/or items 106. For instance, as users 106 enter and exit the facility 102 through the gate 14, the cameras 116 may take pictures of the users 108. In some instances, cameras 116 may be placed on the inventory locations 116, such as in shelves of the inventory locations 112, and take pictures of items 106 or rows or items 106 at various points in time.

The sensors of the facility 102 may further include weight sensors 118 disposed in the inventory locations 112 to detect movement of the items 106. For example, each item 106 or row of items 106 may have associated weight sensors 118 configured to detect changes in weight, which may indicate an item 106 is being taken, returned, or otherwise moved. The weight sensors 118 may measure the weight and changes in weight to determine if items 106 are being interacted with, and time stamp the various measurements. In various examples, additional sensors may be disposed within the facility, such as radio frequency (RF) sensors, temperature sensors, humidity sensors, vibration sensors, and so forth, to take measurements in the facility 102.

The various sensors (e.g., cameras 116, weight sensors 118, etc.) may be configured to provide information suitable for locating users 108, items 106, or other objects in the facility 102. For example, the sensors may be used to identify what items 106 are taken by which users 108 and placed in a shopping cart or other tote 104 of the user 108.

Generally, the facility 102 may maintain a listing of items 106 taken, or interacted with, by the users 108 as the users are in the facility 102. For instance, in an example where the facility 102 is an automated store, the facility 102 may determine what items 106 were taken by the user 108 when the user 108 leaves the facility, and charge an account of the user 108 for the cost of the items 106. Thus, users 106 may engage in a session in the facility 102 where a session includes the events that might affect the listing of items 106 potentially taken by the user 108.

As illustrated, different users 108 may engage in sessions in the facility 102. For instance, a user A 108(1) may engage in session A on their own, and a group of users B 108(2) (e.g., a parent and child, group of friends, couple, etc.) may engage in a session B where all items 106 taken by a member of the group of users B 108(2) are attributed to a same listing of items and/or account. As the users 108 move through the facility 102 and interact with items 106 and/or perform other actions or events, the sensors 118 and/or cameras 116 may generate sensor data that represents the actions and events in which the users 108 are involved and time stamp the sensor data.

The facility 102 and sensors may include, or be communicatively coupled to, servers 120 that host or comprise an inventory management system 116. For example, the materials handling facility 102 and/or sensors may communicate with the inventory management system 116 using a network 122. The network 122 may represent an array of wired networks, wireless networks (e.g., WiFi), or combinations thereof. The inventory management system 116 contains one or more modules configured to interact with users 108 or devices such as the sensors, robots, material handling equipment, computing devices, and so forth, in the materials handling facility 102. The inventory management system 116 may further include modules configured to receive data from the sensors (e.g., cameras 116, weight sensors 118, etc.) and analyze the received sensor data 124 to identify events that occurred within the materials handling facility 102. For instance, the inventory management system 126 may detect events such as the entry of a user 108 into the materials handling facility 102, stocking of items 106 at an inventory location 112, picking of an item 106 by a user 108 from an inventory location 112, placement of an item 106 within a tote 104 of a user 108, movement of the users 108 relative to each other, exiting of a user 108 from the materials handling facility 102, returning of an item 106 by a user 108 to an inventory location 112, and so forth. For example, the inventory management system 116 may have modules configured to perform facial recognition on a user 108 in a video captured by an imaging sensor 112 to determine an identify of the user 108, and analyze data from a weight sensor 114 to determine an item 106 was taken from an inventory location 112 near the identified user 108, and determine that the identified user 108 took the item 106 from the inventory location 112.

Upon determining an occurrence of the event, the inventory management system 116 may be configured to generate and output data which comprises information about the event. For example, if the event comprises an item 106 being taken from an inventory location 112, the output data may comprise an item identifier indicative of the particular item 106 that was removed from the inventory location 112.

The inventory management system 116 may use one or more automated systems to generate the output data about the event. For example, neural networks, classifiers, or other automate computing techniques may be used to process the sensor data and generate output data for the event. The automated systems may operate using probabilistic or non-probabilistic techniques. For example, the automated systems may use a Bayesian network. In another example, the automated systems may use support vector machines to generate the output data. The automated systems may generate confidence level data that provides information indicative of the accuracy or confidence that the output data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 106, user 108, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space. The confidence level may be determined based at least in part on these differences.

In some situations, the automated techniques may be unable to generate output data with a confidence level above a threshold value. For example, the automated techniques may be unable to distinguish which user 108 in a crowd of users 108 has picked up the item 106 from the inventory location 112. In such examples, it may be advantageous for an associate 120 to provide input to identify details of an event that the automated techniques are unable to determine.

The inventory management system 126 may receive the sensor data 124 collected in the facility 102, and determine session data 128 for session A and session B. The session data 128 may indicate identities of the users 108 in the sessions, a beginning of the sessions, an end of the sessions, and/or other session data 128. Further, the inventory management system 126 may determine event data 130 for the events performed by the users 108 during session A and session B. The event data 130 may indicate one or more events that occurred in the facility 102 that, in some examples, involved or is associated with the user 108 in the session data 128. The event data 130 may, in some examples, correspond to events that happened in the facility 102 that was identified as involving the user 108, and/or involving other users 108.

The session data 128 and event data 130 may be provided to a session reasoning engine 132 to determine outcomes for the entirety of the sessions A and B. The session reasoning engine 132 may iteratively generate probabilistic receipts that indicate a probability or likelihood that the event data 130 accurately represents the events that occurred in the sessions. The session reasoning engine 132 may call the algorithm component 134 to determine one or more ranked algorithms 136 to use to further process event data 130 to a hypothesis or result with a higher confidence value. After further processing of the event data 130, the session reasoning engine 132 may determine final item listings 138 for each of the sessions A and B.

In some examples, the session reasoning engine 132 may use one or more algorithms 136 to reduce ambiguity in an initial item listing 138. In one example, an algorithm 136 may include identifying a first event in the session of a user 108 at a particular time, and identifying a second event in the session of the user 108 at a different time. In some instances, the session reasoning engine 132 determine that the two events are pairs such that they correspond or match to each other at some level. For instance, the session reasoning engine 132 may determine that an item 106 of a particular weight was taken from a particular location, and the item 106 of the particular weight was then returned to the location 112 at a later time in the session. The session reasoning engine 132 may need not determine additional information for the events 110, such as the user 108 involved, the item 106 involved, etc., but may simply cancel out the paired events 110 because they result in a net zero for the final item listing 138.

As noted above, in some examples, the servers 120 may perform some or all of the operations described below as being performed by the tote 104. While the servers 120 are illustrated as being in a location outside of the facility 102, in other implementations, at least a portion of the servers 120 may be located at the facility 102.

Figure 2:
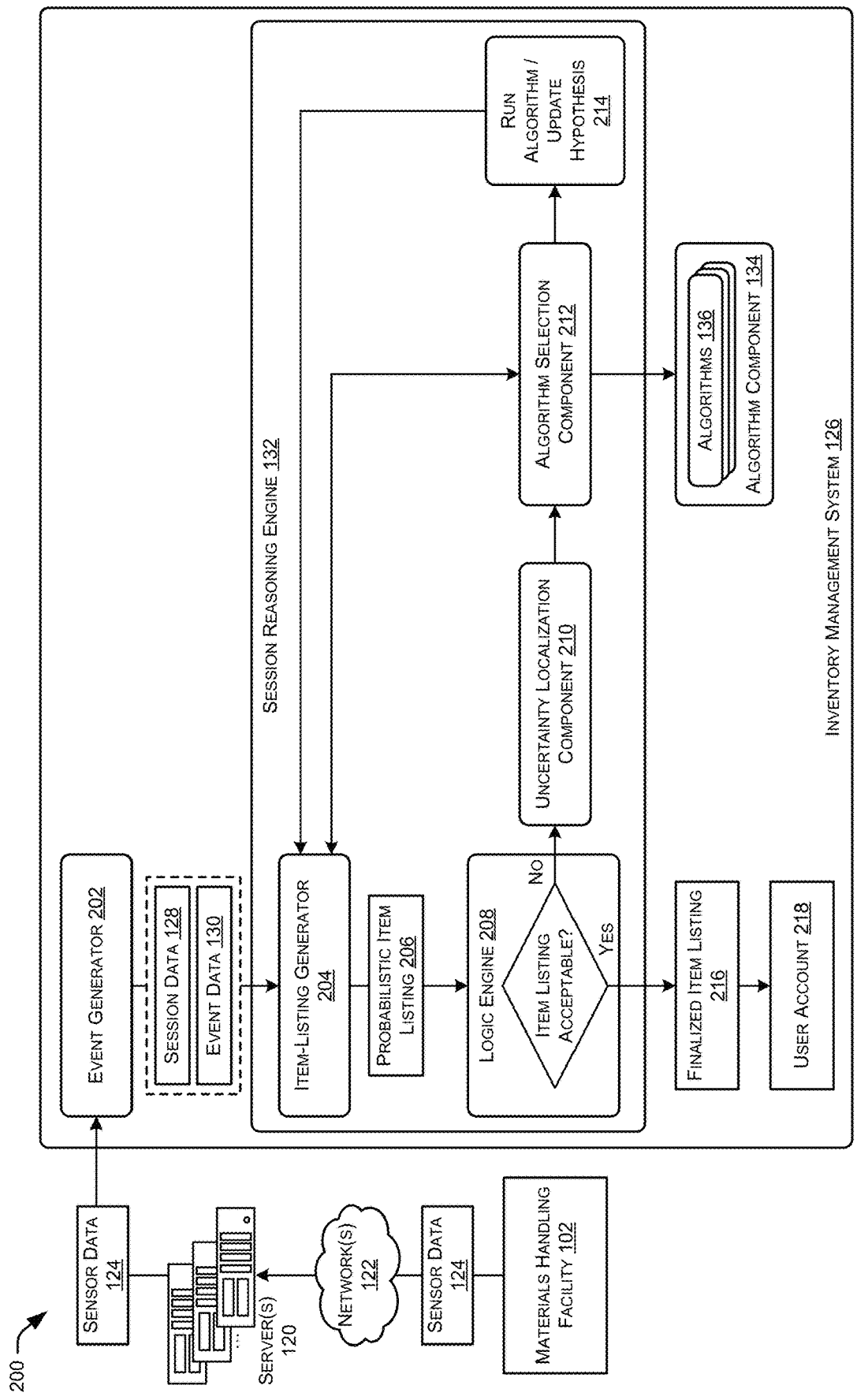
FIG. 2 is a block diagram of an example inventory management system that includes a session reasoning engine to iteratively resolve uncertainty in item listings of items taken from a facility by a user.

FIG. 2 is a block diagram 200 of an example inventory management system that includes a session reasoning engine to iteratively resolve uncertainty in item listings of items taken from a facility by a user.

An event generator 202 may initially analyze the sensor data 124 obtained or generated by sensors in the facility 102 to generate output data that provides information indicative of the events 110 in a session involving a user 108. For example, the event generator 202 may process the sensor data 124 to determine the occurrence of the events 110 in the facility 102 involving a user 108, and determine an initial hypothesis or multiple hypotheses for a result of each respective event 110 along with a confidence value indicating an estimation of accuracy of the hypothesis for each event (e.g., 90% confidence the result is accurate)

In some examples, the event generator 202 may include or utilize a hypothesis-accuracy-prediction service (HAP) service. The HAP service may utilized a trained model, such as a neural network, a random-forest model, or any other type of model that has been trained to classify data. For example, the model may have been trained using supervised learning to determine a degree or measure of accuracy for hypotheses indicating different results of events 110. To train the model, the HAP system may have input data into the model along with corresponding ground-truth labels. For example, the HAP system may have obtained results of a large number of different events 110 based on respective sets of sensor data 124, and associated those events with known results.

The event generator 202 (e.g., HAP system) may use sensor data 124 to determine occurrence of an event 110, such as a user 108 picking an item 106 from a shelf in the facility 102. The event generator 202 may use this sensor data 124 to associate a result to an event record associated with this event 110, such as indication of an item identifier of the item 106 picked, a number of the total items picked, a user 108 that picked the item 106, etc. Further, the event generator 202 may calculate a confidence value associated with the determined result. For instance, the event generator 202 may extract feature data from the sensor data 124 associated with the event 110, and potentially feature data based on historical data, and may input this feature data into a trained model (or classifier). The model may comprise a convolutional neural network (CNN), a random-forest model, and/or the like. The trained model may then output, for example, a numerical value indicating a likelihood that the hypothesis indicates a correct result for what occurred during the event 110. For example, the trained model may output a numerical value indicating a likelihood that one or more human associates would determine the same result as the hypothesis.

In some examples, the event generator 202 may determine multiple hypotheses indicating different results for an event 110, where each hypothesis has a different confidence value. The hypotheses may differ from each other in various ways, such as determining results for an event 110 that involve different items 106 being taken, different users 108 involved in the event 110, different numbers of items 106 being taken, different actions being taken (e.g., take of an item 106, return of an item 106, take/return of a foreign object, such as a user's 108 cell phone, etc.) In this way, the event generator 202 may generate multiple hypotheses indicating results for an event 110 with different confidence levels. The hypothesis may be included in the event data 130 such that each event 110 that occurred in the facility 102 during the session of the user 108 is associated with the session of that user 108, and is further associated with one or more hypotheses indicating potential results of the events 110. In some examples, the event data 130 may include data only for events 110 that were determined to involve a user 108 for the corresponding session, and in other examples, the event data 130 may include data for all events occurring in the facility 102 during the session of the user 108.

An item-listing generator 204 may receive the session data 128 and event data 130 for sessions of users 108 and generate a probabilistic item listing 206. For instance, the item-listing generator 204 may use the hypotheses for results determined for each event 110, the confidence values for those hypotheses, and generate an initial probabilistic item listing 206 indicating quantities of the items 106 determined to be taken by the user 108 during the session.

To generate the probabilistic item listing 206, the item-listing generator 204 may utilize one or more algorithms that take the confidence values for the hypothesis of each event and turn those into line items with associated probabilities for the probabilistic item listing 206. In some examples, the item-listing generator 204 may utilize historical event data from the facility 102 to help determine the probabilistic item listing 206. For example, the item-listing generator 204 may observe outputs from the event generator 202, and determine how often hypotheses for particular events 110 are correct versus incorrect. Using this observational data overtime, the item-listing generator 204 may determine probabilities that hypotheses for events 110 are correct.

For example, an event 110 may have a hypotheses that a first user 108(1) took an item 106 from a shelf, and then returned that item 108. Another hypothesis for the same event 110 may indicate that the first user 108(1) took the item 106, and a second user 108(2) returned another item 108(2) to the shelf where the item 106 had been placed that was taken by the first user 108(1). The hypotheses may each be associated with respective confidence values indicating a measure of accuracy for the result of the event 110. In such a scenario, the item-listing generator 204 may determine, based on observational data for events 110 occurring in the past with similar hypotheses, that it is unlikely the hypotheses are correct, or have low probabilities of being correct.

The probabilistic item listing 206 may quantify uncertainty by including line-by-line indications of the items 106 determined to be taken (e.g., textual item identifiers) along with probabilities for quantities of the items 106 determined to be taken. For example, one of the lined items may be "apple/quantity 0 (0.3)/quantity 1 (0.5)/quantity 2 (0.2)" where the probabilities for the different quantities of the item "apple" all sum to "1."

The probabilistic item listing 206 may then be provided to a logic engine 208 which may analyze each line item and determine whether the probabilistic item listing 206 is acceptable, or if further processing of the events is needed to remove uncertainty in the probabilistic item listing 206 (e.g., if a probability score for an item is lower than some defined threshold). In some examples, the logic engine 208 may determine that one or more probabilities in the probabilistic item listing 206 are below an acceptable threshold (e.g., 0.8, 0.999, etc.) Upon determining that at least one probability value is less than the threshold, the logic engine 208 may determine that the probabilistic item listing 206 is not acceptable to be finalized.

In some examples, the logic engine 208 may further utilized other metrics or parameters to determine whether a probabilistic item listing 206 is acceptable. In a store example, the logic engine 208 may determine that the line item with a probability value is less than a threshold is a product that has a low value. For example, the line item may indicate that the user 108 took a pack of gum, and there is a 50% chance that they took one pack of gum, and a 50% chance that they took two packs of gum. In such an example, because the price of a pack of gum is low, and because the amount of processing time and resources to resolve the uncertainty in the probabilistic item listing 206 is relatively high, the logic engine 208 may simply determine to just include the quantity of one on the probabilistic item listing 206 and potentially let the user 108 have a free pack of gum, rather than do further processing. As another example, the logic engine 208 may take into account the availability of processing resources available to the inventory management system 126. For example, if the inventory management system 126 is not processing many sessions, and that there is a high availability of resources for the inventory management system 126 to continue processing events 110 in the event data 130, the logic engine 208 may continue to determine that the probabilistic item listing 206 is not acceptable and continue to process the events 110 to iteratively reduce the uncertainty in the probabilistic item listing 206.

In some examples, the logic engine 208 may adjust the threshold associated with determining whether the item listing 206 is acceptable based on one or more of the above metrics. For instance, in the pack of gum example where the line item is below a threshold price, the threshold may be lowered for the item listing of the pack of gum to be considered acceptable (e.g., dropped from 0.99 to 0.50). Conversely, if an item is expensive or costs more than a threshold (e.g., above $10, above $50, etc.), the threshold may be raised or maintained to determine acceptability of that line item 206 (e.g., 0.99). Further, the availability of resources may be taken into account to raise or lower the threshold for acceptability of line items in the item listing 206, such as raising the threshold if there is a high availability of resources for the inventory management system 126 to continue processing events in the session to resolve lower confidence events and raise the probabilities of the item listings 206.

In examples where the logic engine 208 determines that the probabilistic item listing 206 is unacceptable due to uncertainty in an item 106 type and/or quantity of the item 106, an uncertainty localization component 210 may determine which event 110, from all the events 110 in the session with low confidence values, will provide the most information if processed further. For instance, the uncertainty localization component 210 may determine that a particular event 110 associated with the item with low probability values may be most advantageous to process further to determine a result with a higher confidence.

In some examples, the uncertainty localization component 210 may utilize one or more algorithms to perform a hypothetical analysis and determines, of all the events 110 in the session with low confidence, which event 110 would provide the most information to resolve uncertainty if processed further for a higher confidence value. For instance, the uncertainty localization component 210 may determine or speculate, for each event 110, an expected information gain for information that will increase the overall probability of the probabilistic item listing 206. The uncertainty localization component 210 may hypothetically resolve each event 110 according to the current set of hypotheses determined for each event 110, and look at the resulting probabilistic item listings 206 that would be generated from each of the resolve hypothetical scenarios to measure the entropy reduction for the resulting probabilistic item listings 206. In this way, the uncertainty localization component 210 may rank each of the events 110 in the session based on expected information gain from resolving the events to their hypotheses.

After the uncertainty localization component 210 determines an event 110 (e.g., top ranked event 110) from the session to process further to resolve uncertainty in the probabilistic item listing 206, an algorithm selection component 212 may select a particular algorithm 136 to utilize to process the selected event further. In some examples, the algorithm 136 may be selected from a group of algorithms 136 based on an expected information gain for executing the algorithm 136 being higher than expected information gains for executing the other algorithms 136 to analyze the event 110. For example, if the event was initially processed using a vision-based algorithm 136 where image data depicting the item 106 was processed to identify the item 106, the algorithm selection component 212 may select a weight-based algorithm 136 for the event 110. For instance, the algorithm selection component 212 may select an algorithm 136 that analyzes weight data generated by a load cell in an inventory location 112 associated with an item 106 involved in the event 110 to determine, with a higher confidence value, a result for the event 110 that previously had a low confidence value.

In some examples, the algorithms 136 may be ranked and/or selected based on expected information gain, and/or a "cost" associated with running the algorithms 136. For example, the algorithms 136 may require different amounts of time, computing resources, etc., to analyze events 110. For instance, an algorithm 136 that analyzes weight data to determine weights of items 106 may be a less costly algorithm 136 to run as compared to an algorithm 136 that performs more complex image processing of image data representing an event 110. Accordingly, the algorithm selection component 212 may select an algorithm 136 based on one or more of the expected information gain and various costs for running the algorithms 136. In some examples, particular algorithms 136 may be more optimized or appropriate for analyzing different event types 110. For example, an algorithm for analyzing image data to determine which user 108, from among multiple users 108, interacted with an item 106 may be more appropriate than an algorithm 136 that analyzes weight data. For instance, an algorithm 136 may analyze image data to identify hands of the users 108 in the images, and determine which user's 108 hand was holding the item 106. As another example, an algorithm 136 that analyzes weight data may be optimized to determine what item 106, from multiple items 106, was placed on a shelf based on a weight comparison of weights known for the items 106 and the change in weight on the shelf.

In some examples, the session reasoning engine 132 may determine to process multiple events 110 in parallel using multiple algorithms 136. For instance, the algorithm selection component 212 may select a first algorithm 136 to analyze a first event 110 based on expected information gain and/or cost, and also select a second algorithm 136 to analyze a second event 110 at least partially at the same time.

After the session reasoning engine 132 has selected one or more algorithms 136 to run to process the event(s) 110, the session reasoning engine 132 may run the algorithm(s) 136 at 214 and update the hypotheses for each event 110. In some examples, at 214 the session reasoning engine 132 may determine which hypothesis from a group of hypotheses determined for the event 110 indicates the correct result. Stated otherwise, the algorithm 136 may be able to determine which hypothesis represents the correct result for the event 110 with more than a threshold confidence.

After processing, at 214, the event(s) 110 with the low confidence value with the selected algorithm(s) 136 to determine a result with a higher confidence value, the inventory management system 126 may re-compute the probabilistic item listing 206 using updated hypothesis and/or updated confidence values for the events 110 in the session. The logic engine 208 may then analyze each line item in the updated probabilistic item listing 206 and determine whether the probabilistic item listing 206 is acceptable after re-processing the event(s) 110, or if further processing of the events 110 is needed to remove uncertainty in the updated probabilistic item listing 206. The session reasoning engine 132 may iteratively process events 110 with low confidence values as described above until a final probabilistic listing of the items taken by the user is determined to be acceptable (e.g., probability values for each line item are greater than the threshold).

Upon determining that a finalized item listing 216 is acceptable with respect to uncertainty for the items and quantity of the items 106, the inventory management system 126 may output the finalized item listing 216 and close the session for the user 108 that was being analyzed. The finalized item listing 216 may, in some examples, be stored or associated with a user account 218. In examples where the session is a shopping session, a payment instrument of the user account 218 may be charged for the cost of the items 106 determined to be taken by the user 108 during the session.

In some examples, the item-listing generator 204 may intentionally insert uncertainty into the probabilistic item listing 206 to account for various event data 130. For example, the inventory management system 126 may determine tidiness data that indicates how tidy an inventory location 112 is at the time of an event 110. For example, if a shelf is untidy, meaning items 106 are not placed back into their appropriate locations, the wrong items 106 were placed in inventory locations 112, etc., the item-listing generator 204 may receive that data as part of the event data 130 and determine there is uncertainty in an event 110.

For instance, the item-listing generator 204 may determine that the probability associated with an item 106 that was taken or removed from the untidy location cannot be over the threshold probability. In some examples, the item-listing generator 204 may call the algorithm selection component 212 to select and run an algorithm to determine a hypothesis for untidiness associated with an event. In such examples, the item-listing generator 204 may, in conjunction with the algorithm selection component, perform hypothesis augmenting where one or more line items with low probability values are added, and/or one or more hypothesis are added to line items that are lower than the threshold probability. In this way, the item-listing generator 204 may ensure that an event 110 will be processed further to resolve any ambiguity caused by, for example, an untidy location or untidy interaction with an item 106. Stated otherwise, the item-listing generator 204 can force or cause the probabilistic item listing 206 to fail at the logic engine 208 and proceed to have events 110 processed further to account for potential uncertainties from the events 110 in the session.

Figure 3:
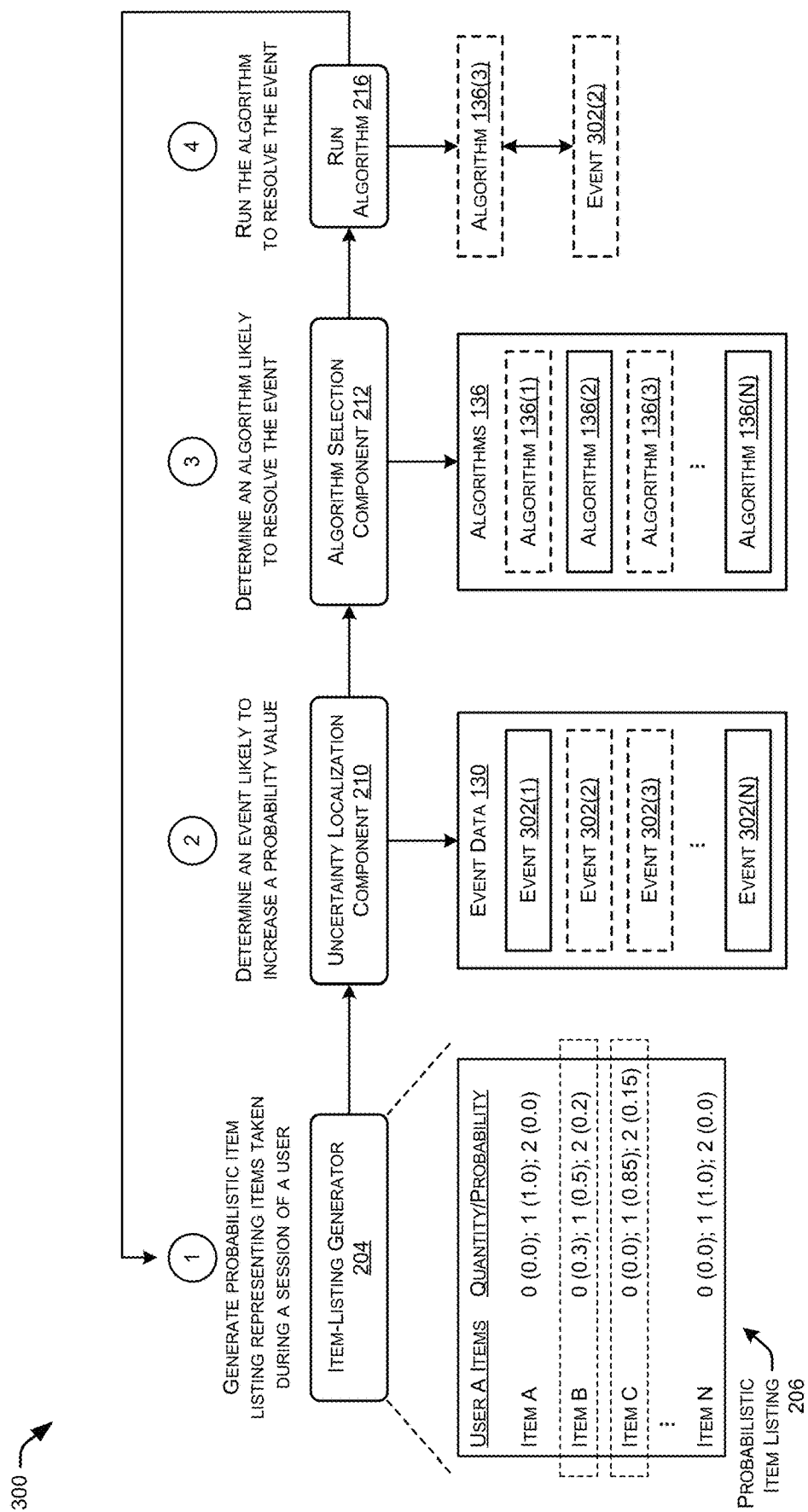
FIG. 3 illustrates an example flow diagram of determining an event and an algorithm that are likely to resolve events to increase probability values for items included in an item listing.

FIG. 3 illustrates an example flow diagram 300 of determining an event 110 and an algorithm 136 that are likely to resolve events 110 to increase probability values for items 106 included in an item listing 208.

As described with respect to FIG. 2, the item-listing generator 204 may, at "1," generate a probabilistic item listing 206 that represents items 106 taken during a session of a user 108, as well as probabilities for quantities of the items 106 taken. At "2," the uncertainty localization component 210 may determine an event 110 likely to increase a probability value in the probabilistic item listing 208. In some examples, the event 110 may be associated with the item 106 that has probability values that were determined to be less than the threshold for acceptable probability values. As illustrated, the events 302 in the event data 130 may be ranked based on various metrics, such as an estimated information gain expected for the probabilistic item listing 206 if the events 110 were to be resolved to a single hypothesis indicating the determined result of the event 110. In some examples, the uncertainty localization component 210 may select multiple events 302 to be processed based on, for example, the items 106 with uncertainty being interacted with during those events 110.

At "3," the algorithm selection component 212 may select one or more algorithms 136 to run to remove hypotheses from events 110, and select a particular hypothesis for the event 110 from the multiple hypotheses previously determined as possible for the event 110. As noted above, the algorithm(s) 136 may be selected based on being optimized for the type of event 110, the cost associated with running the algorithms 136, the overall expected information gain for the probabilistic item listing 206, and/or other metrics that may be considered in addition or as an alternative. At "4," the session reasoning engine 132 may run the algorithm(s) 136 for the event(s) 110 to select a hypothesis for each event 110 from among the group of possible hypotheses for the events 110.

FIGS. 4A-4C, 5, and 6 illustrate flow diagrams of example methods 400, 500, and 600 that illustrate aspects of the functions performed at least partly by the service provider network 102 as described in this disclosure. The logical operations described herein with respect to FIGS. 4A-4C, 5, and 6 may be implemented (1) as a sequence of computer-implemented acts or program modules running on a computing system and/or (2) as interconnected machine logic circuits or circuit modules within the computing system. The processes 400, 500, and 600 discussed herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4A-4C, 5 and 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 4A:
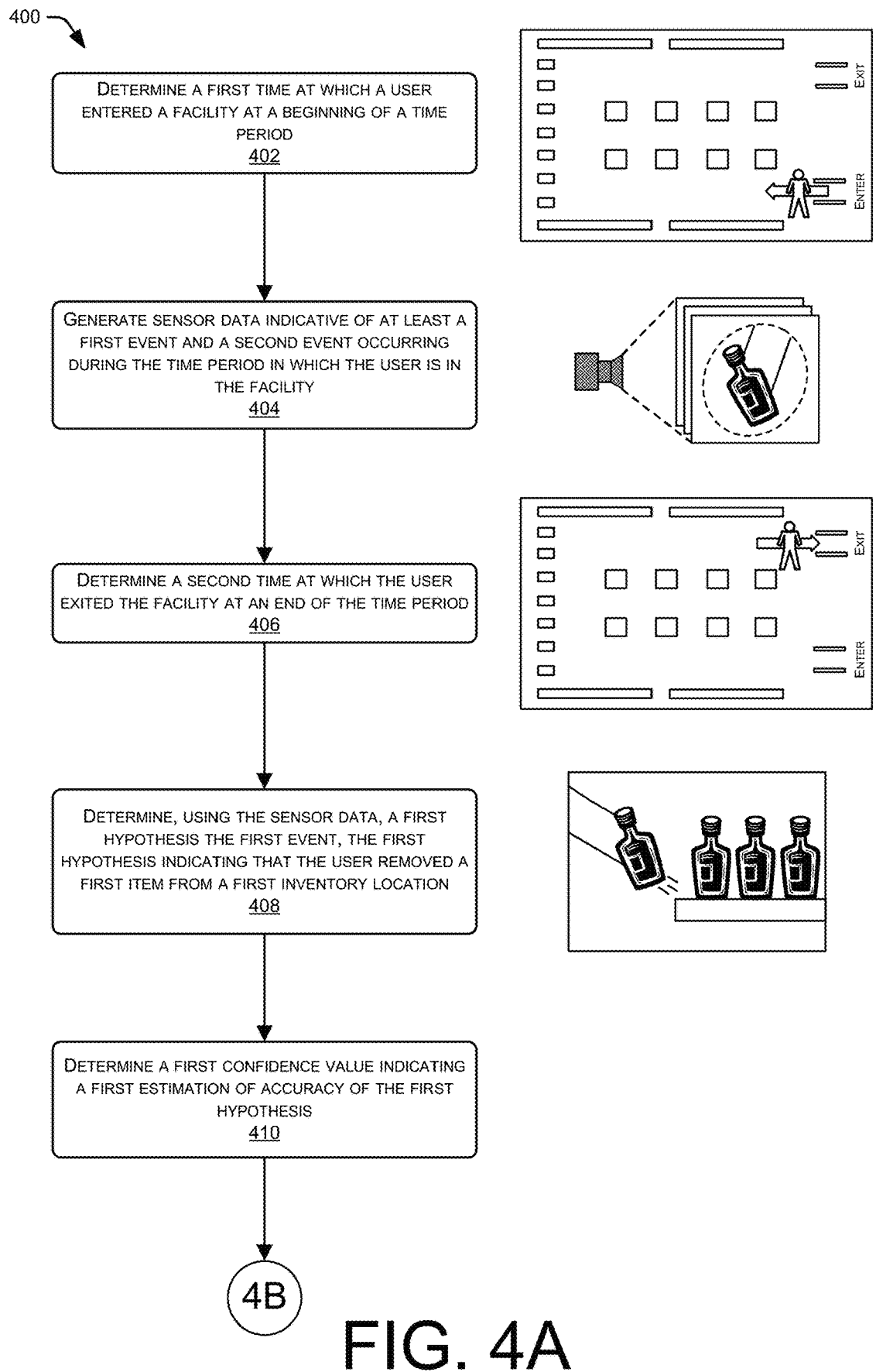
FIGS. 4A-4C illustrate a flow diagram of an example process for an inventory management system to analyze sensor data and determined events for a session of a user in a facility after the session has ended. The inventory management system may generate a first listing of item identifiers indicating items taken by the user during the session, determine a result for an event in the session using an algorithm, and generate a second listing of item identifiers that has a greater probability of being accurate than the first listing.
Figure 4B:
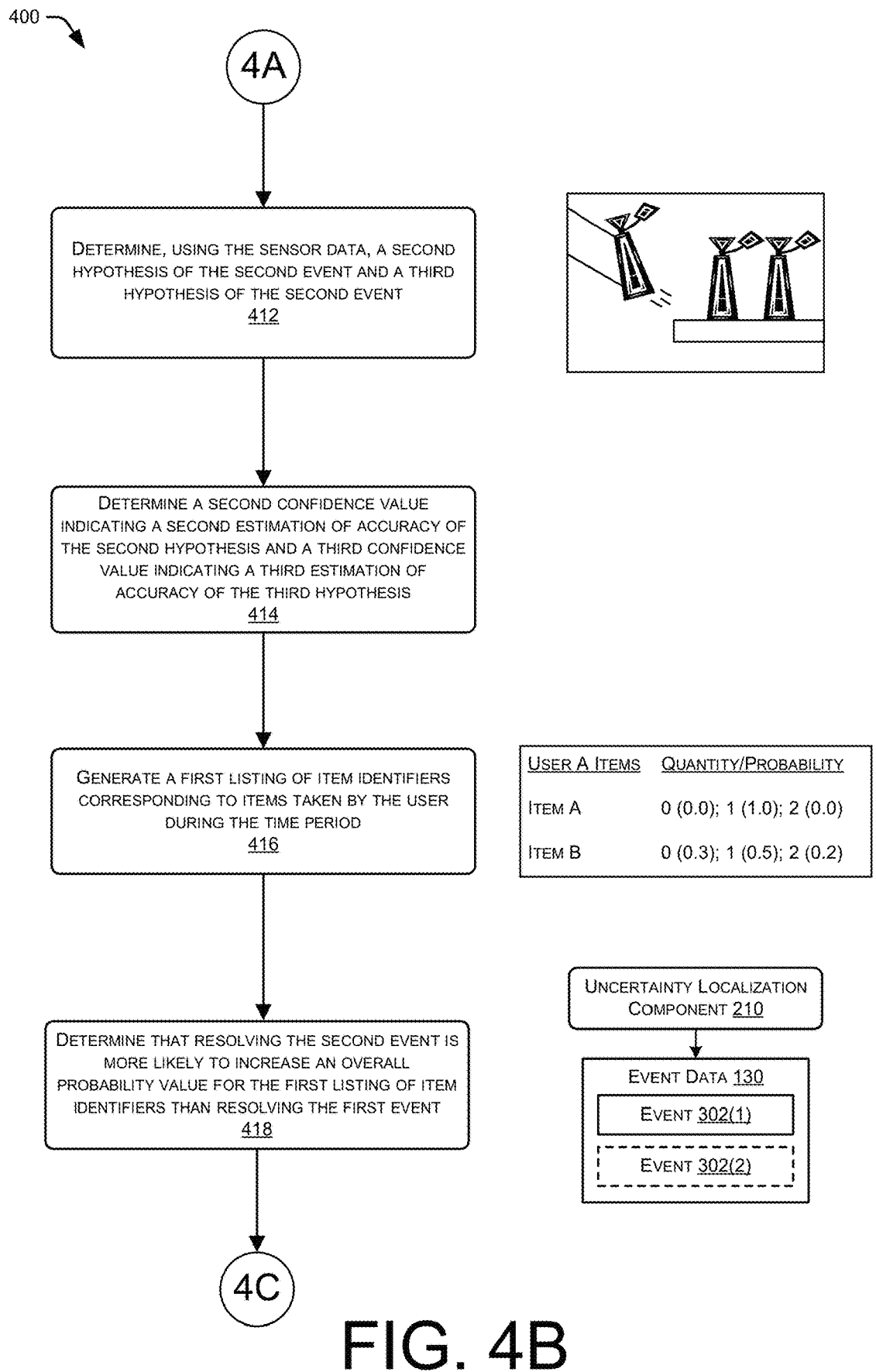
Figure 4C:
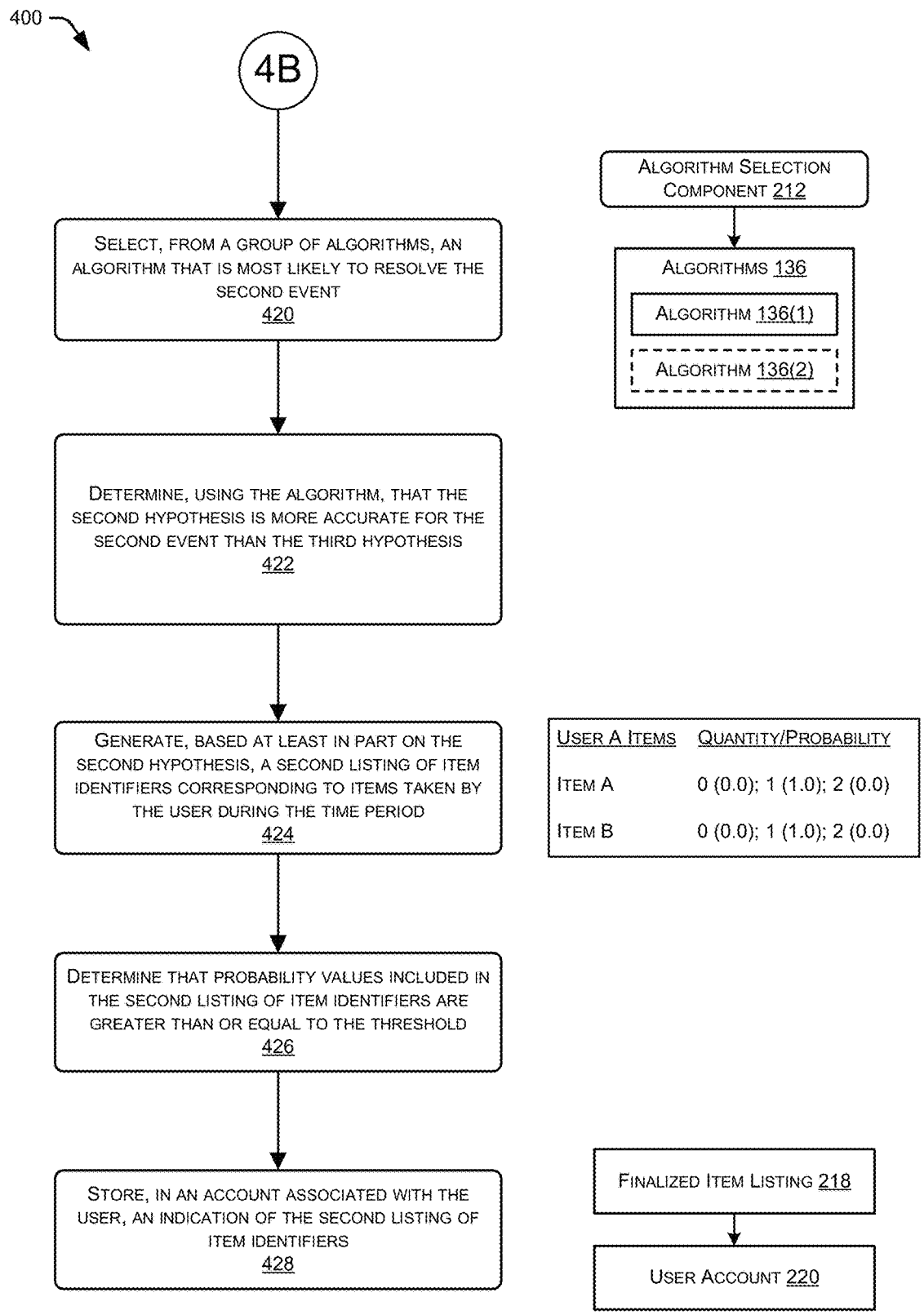

FIGS. 4A-4C illustrate a flow diagram of an example process 400 for an inventory management system 126 to analyze sensor data and determined events for a session of a user in a facility after the session has ended. The inventory management system 126 may generate a first listing of item identifiers indicating items taken by the user during the session, determine a result for an event in the session using an algorithm, and generate a second listing of item identifiers that has a greater probability of being accurate than the first listing.

At 402, the inventory management system 126 may determine a first time at which the user entered the facility at a beginning of a time period (e.g., session). At 404, one or more sensors in the facility 102 may generate sensor data indicative of at least a first event and a second event occurring during the session of the user in the facility 102. In some examples, the first event and second event may involve the user, and in other examples, the first event and/or second event may involve users other than the user or other events in the facility 102.

At 406, the inventory management system 126 may determine a second time at which the user exited the facility at an end of the time period, wherein the sensor data is indicative of a plurality of events occurring during the session in which at least the user interacted with one or more items. As noted above, the events may involve the user or affect the item listing 206 of the user 108, and in other examples the events may involve other users or other events remote from the user 108.

The inventory management system 126 may determine that the user 108 entered and exited the facility 102 in various ways, such as the user showing their face to a facial recognition system, by presenting a token carrying authentication credentials, providing a fingerprint, scanning a barcode or other type of unique identifier upon entering the facility, and so forth. Identity of the user 108 may be determined before, during, or after entry to the facility 102. Determination of the user's 108 identity may comprise comparing sensor data associated with the user 108 in the facility 102 to previously stored user data.

At 408, the inventory management system 126 may determine, using the sensor data, a first hypothesis of the first event where the first hypothesis indicates that the user removed a first item from a first inventory location in the facility (e.g., removed one item, removed two items, etc.). In some examples, the inventory management system 126 may analyze the sensor data after the user has ended the time period and exited the facility, and in other examples, the processing of the sensor data may begin while the user 108 is still in the facility 102 engaged in the session.

At 410, the inventory management system 126 may determine a first confidence value indicating a first estimation of accuracy of the first hypothesis. At 412, the inventory management system 126 may determine, using the sensor data, a second hypothesis of the second event and a third hypothesis the second event, where the second hypothesis indicates that the user removed a second quantity of a second item from a second inventory location in the facility 102 (e.g., quantity of 0, 1, 2, etc.) and the third hypothesis indicating that the user removed a third quantity of the second item from the second inventory location in the facility 102.

At 414, the inventory management system 126 may determine a second confidence value indicating a second estimation of accuracy of the second hypothesis. Further, the inventory management system 126 may determine a third confidence value indicating a third estimation of accuracy of the third hypothesis.

At 416, the inventory management system 126 may generate a first listing of item identifiers corresponding to items taken by the user during the session. The first listing of item identifiers may include a first item identifier corresponding to the first item and a first probability value indicating a first likelihood that a first quantity of the first item was taken by the user, a second item identifier corresponding to the second item, a second probability value indicating a second likelihood that the second quantity of the second item was taken by the user, and a third probability value indicating a third likelihood that the third quantity of the second item was taken by the user. (e.g., quantity "0" with probability "0.3," quantity "1" with probability "0.7," etc.).

In some examples, the inventory management system 126 may determine that the first probability value is less than a threshold at 418, the inventory management system 126 may determine that resolving the second event is more likely to increase an overall probability value for the first listing of item identifiers than resolving the first event. For example, the second event is associated with a greater expected improvement (e.g., overall information gain) in the overall probability value. The method 400 may include determining an amount of computing resources to use the algorithm to analyze the second event, determining an amount of time taken to use the algorithm to analyze the second event, and/or determining an expected improvement in the overall probability value for the first listing of item identifiers by using the algorithm to analyze the second event. In such examples, selecting the algorithm from the group of algorithms is based at least in part on one or more of the amount of computing resources, the amount of time, or the expected improvement.

At 420, the inventory management system 126 may select, from a group of algorithms, an algorithm that is most likely to resolve the second event. At 422, the inventory management system 126 may determine, using the algorithm, that the second hypothesis is more accurate for the second event than the third hypothesis.

At 424, the inventory management system 126 may generate, based at least in part on the second hypothesis, a second listing of item identifiers corresponding to items taken by the user during the session. For instance, the inventory management system 126 may now disregard the third hypothesis for the second event, and use a higher confidence score for the second hypothesis for the second event. At 426, the inventory management system 126 may determine that probability values included in the second listing of item identifiers are greater than or equal to the threshold. At 428, the inventory management system 126 may store, in an account associated with the user, an indication of the second listing of item identifiers.

Figure 5:
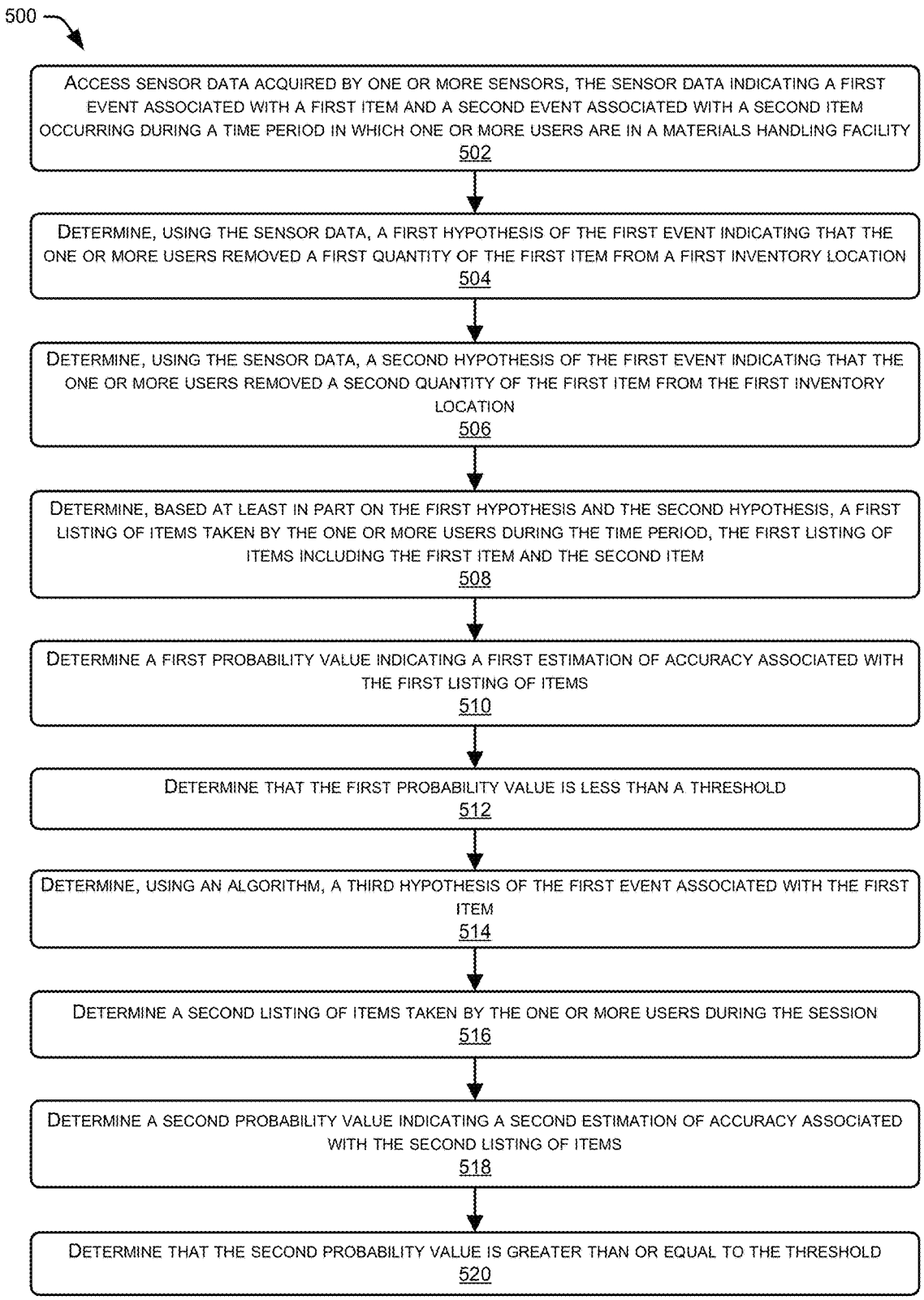
FIG. 5 illustrates a flow diagram of an example process for an inventory management system to analyze events after a session of a user is complete, determine an initial listing of items taken by the user in the session, and update the listing of items to be more accurate after further processing an event in the session.

FIG. 5 illustrates a flow diagram of an example process 500 for an inventory management system 126 to analyze events after a session of a user is complete, determine an initial listing of items taken by the user in the session, and update the listing of items to be more accurate after further processing an event in the session.

At 502, the inventory management system 126 may access sensor data acquired by one or more sensors, the sensor data indicating a first event associated with a first item and a second event associated with a second item occurring during a time period in which one or more users are in a materials handling facility. In some examples, the one or more users may be identified as being included in a group of users (e.g., parent and child, group of friends, etc.). in some instances, the first and second event may involve or be caused by the one or more users, and in some examples the first and second event may involve or be caused by other users in the facility.

At 504, the inventory management system 126 may determine, using the sensor data, a first hypothesis of the first event indicating that the one or more users removed a first quantity of the first item from a first inventory location (e.g., took zero items, took one item, took two items, etc.).

At 506, the inventory management system 126 may determine, using the sensor data, a second hypothesis of the first event indicating that the one or more users removed a second quantity of the first item from the first inventory location. Generally, the second quantity of the first item is different than the first quantity of the first item indicated by the first hypothesis.

At 508, the inventory management system 126 may, based at least in part on the first hypothesis and the second hypothesis, a first listing of items taken by the one or more users during the time period, the first listing of items including the first item and the second item.

At 510, the inventory management system 126 may determine a first probability value indicating a first estimation of accuracy associated with the first listing of items. In some instances, the first probability value may be associated with the overall first listing of items based on how accurate each item listing in the listing of items when considered as a group. In some examples, the first probability value may be associated with a single item listing in the first listing of items, such as a first quantity of a particular item determined to be taken by the user 108. In some examples, each item listing in the first listing of items may be associated with one or more probability values indicating the likelihood that a quantity of each item was taken by the one or more users from the facility. At 508, the inventory management system 126 may determine that the first probability value is less than a threshold.

In some examples, the threshold may be determined, selected, and/or modified based on processing-cost data associated with the event and/or item at issue. For instance, the processing-cost data may be determined based at least in part on at least one of an amount of computing resources to use the algorithm to analyze the first event (e.g., processing power to execute the algorithm), a price associated with the first item (e.g., lower the threshold for "cheaper" items (e.g., one dollar, five dollars, etc.) or raise the threshold for "expensive" items), an amount of time taken to use the algorithm to analyze the first event, or an expected improvement in the first probability value by using the algorithm to analyze the first event (e.g., determine the information gain for the different hypotheses for the first event, and if the information is large, then the threshold may be raised). In such examples, the inventory management system may determine, select, modify, etc., a value of the threshold based at least in part on the processing-cost data. However, in some examples the threshold may simply be a predefined, static threshold. At 512, the inventory management system 126 may determine that the first probability value is less than the threshold.

At 514, the inventory management system 126 may determine, using an algorithm, a third hypothesis of the first event associated with the first item. In some examples, determining the third hypothesis of the first event may include selecting the third hypothesis from among of group of hypotheses, such as the first hypothesis and the second hypothesis initially determined for the event. After processing the event 110 further, the inventory management system 126 may determine that the third hypothesis (e.g., first hypothesis, second hypothesis, a new hypothesis altogether, etc.) is the most appropriate from among the group of hypotheses initially determined for the event. At 516, the inventory management system 126 may, based at least in part on the result of the first event, determine a second listing of items taken by the one or more users during the time period.

At 518, the inventory management system 126 may determine a second probability value indicating a second estimation of accuracy associated with the second listing of items. At 520, the inventory management system 126 may determine that the second probability value is greater than or equal to the threshold.

In some examples, the first and second probability values may be associated with individual item listings in a probabilistic item listing 206, and in other examples, the first and second probability values may be overall values for the whole probabilistic item listing 206 being correct.

Figure 6:
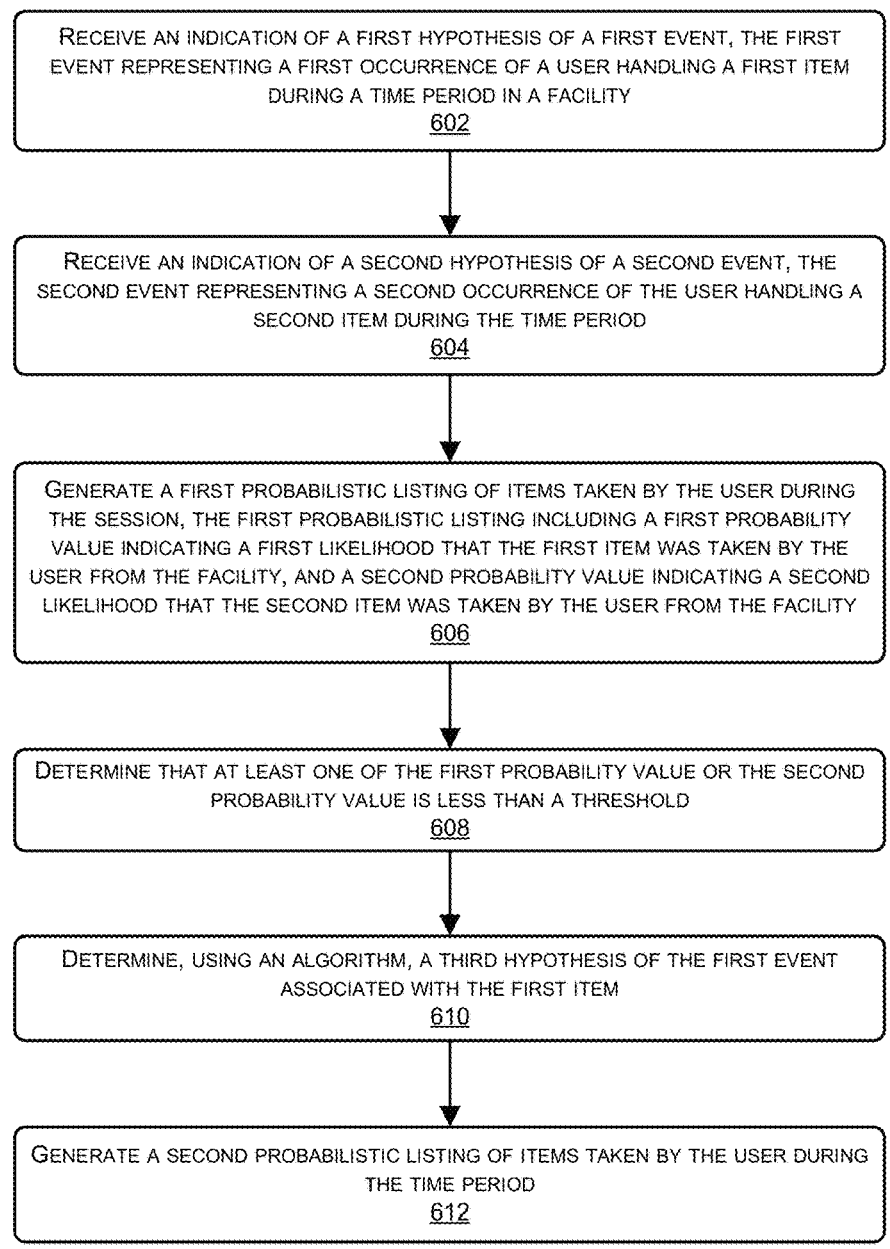
FIG. 6 illustrates a flow diagram of an example process for an inventory management system to analyze events after a session of a user is complete, determine an initial probabilistic receipt indicating items taken by the user in the session, and update probabilistic receipt to more accurately indicate items taken by the user after further processing an event in the session.

FIG. 6 illustrates a flow diagram of an example process 600 for an inventory management system to analyze events after a session of a user is complete, determine an initial probabilistic receipt indicating items taken by the user in the session (e.g., time period in which the user is in the facility), and update probabilistic receipt to more accurately indicate items taken by the user after further processing an event in the session.

At 602, the inventory management system 126 may receive an indication of a first hypothesis of a first tentative result of a first event, the first event representing a first occurrence of a user handling a first item during a time period in which the user is in a facility.

At 604, the inventory management system 126 may receive an indication of a second hypothesis of a second tentative result of a second event, the second event representing a second occurrence of the user handling a second item during the time period in the facility.

At 606, the inventory management system 126 may generate a first probabilistic listing of items taken by the user during the time period. The first probabilistic listing may include a first probability value indicating a first likelihood that the first item was taken by the user from the facility, and a second probability value indicating a second likelihood that the second item was taken by the user from the facility.

At 608, the inventory management system 126 may determine that at least one of the first probability value or the second probability value is less than a threshold. At 610, the inventory management system 126 may determine, using an algorithm, a result of the first event associated with the first item. At 612, the inventory management system 126 may, based at least in part on the result of the first event, generate a second probabilistic listing of items taken by the user during the time period.

Figure 7:
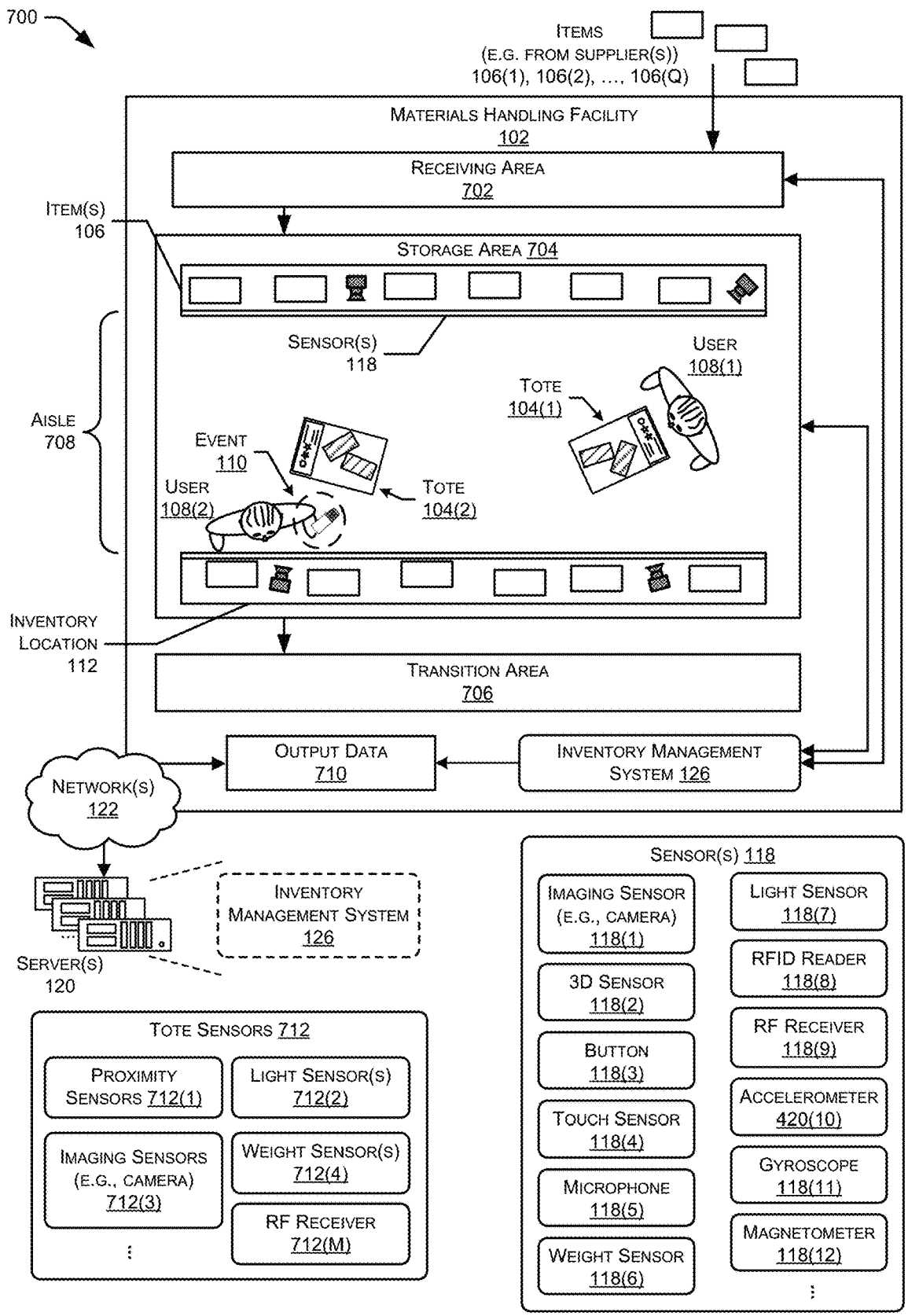
FIG. 7 is a block diagram of a materials handling facility that includes sensors and an inventory management system configured to generate output regarding events occurring in the facility using the sensor data. The events may include, for example, a user picking an item or returning an item. The facility and/or tote may include example sensors that may be utilized to generate sensor data to detect the events.

FIG. 7 is a block diagram of a materials handling facility 102 that includes sensors 118 and an inventory management system 126 configured to generate output regarding events 110 occurring in the facility using the sensor data. The events 110 may include, for example, a user 108 picking an item 106 or returning an item 106. The facility 102 and/or tote 104 may include example sensors 712 that may be utilized to generate sensor data to detect the events 110. However, the following description is merely one illustrative example of an industry and environment in which the techniques described herein may be utilized.

A materials handling facility 102 (facility) comprises one or more physical structures or areas within which one or more items 106(1), 106(2), . . . , 106(Q) (generally denoted as 106) may be held. As used in this disclosure, letters in parenthesis such as "(Q)" indicate an integer result. The items 106 comprise physical goods, such as books, pharmaceuticals, repair parts, electronic gear, groceries, and so forth.

The facility 102 may include one or more areas designated for different functions with regard to inventory handling. In this illustration, the facility 102 includes a receiving area 702, a storage area 704, and a transition area 706. The receiving area 702 may be configured to accept items 106, such as from suppliers, for intake into the facility 102. For example, the receiving area 702 may include a loading dock at which trucks or other freight conveyances unload the items 106.

The storage area 704 is configured to store the items 106. The storage area 704 may be arranged in various physical configurations. In one implementation, the storage area 704 may include one or more aisles 708. The aisles 708 may be configured with, or defined by, inventory locations 112 on one or both sides of the aisle 708. The inventory locations 112 may include one or more of shelves, racks, cases, cabinets, bins, floor locations, or other suitable storage mechanisms for holding or storing the items 106. The inventory locations 112 may be affixed to the floor or another portion of the facility's structure, or may be movable such that the arrangements of aisles 708 may be reconfigurable. In some implementations, the inventory locations 112 may be configured to move independently of an outside operator. For example, the inventory locations 112 may comprise a rack with a power source and a motor, operable by a computing device to allow the rack to move from one location within the facility 102 to another.

One or more users 108(1), 108(2), . . . , 108(U), totes 104(1), 104 (2), . . . , 104 (T) (generally denoted as 104) or other material handling apparatus may move within the facility 102. For example, the users 108 may move about within the facility 102 to pick or place the items 106 in various inventory locations 112, placing them on the totes 104 for ease of transport. An individual tote 104 is configured to carry or otherwise transport one or more items 106. For example, a tote 104 may include a basket, a cart, a bag, and so forth. In other implementations, other agencies such as robots, forklifts, cranes, aerial drones, and so forth, may move about the facility 102 picking, placing, or otherwise moving the items 106.

One or more sensors 118 may be configured to acquire information in the facility 102. The sensors 118 may include, but are not limited to, imaging sensors 118(1), weight sensors, radio frequency (RF) receivers, temperature sensors, humidity sensors, vibration sensors, and so forth. The sensors 118 may be stationary or mobile, relative to the facility 102. For example, the inventory locations 112 may contain cameras 118(1) configured to acquire images of pick or placement of items 106 on shelves, of the users 108(1) and 416(2) in the facility 102, and so forth. In another example, the floor of the facility 102 may include weight sensors configured to determine a weight of the users 108 or other object thereupon. The sensors 118 are discussed in more detail below.

During operation of the facility 102, the sensors 118 may be configured to provide information suitable for locating how objects move or other occurrences within the facility 102. For example, a series of images acquired by an imaging sensor 118(1) may indicate removal of an item 106 from a particular inventory location 112 by one of the users 108 and placement of the item 106 on or at least partially within one of the totes 104.

While the storage area 708 is depicted as having one or more aisles 708, inventory locations 112 storing the items 106, sensors 118, and so forth, it is understood that the receiving area 706, the transition area 706, or other areas of the facility 102 may be similarly equipped. Furthermore, the arrangement of the various areas within the facility 102 is depicted functionally rather than schematically. For example, multiple different receiving areas 706, storage areas 408, and transition areas 710 may be interspersed rather than segregated in the facility 102.

The facility 102 may include, or be coupled to, an inventory management system 126, which form a portion of the system 104 described above with reference to FIG. 1. The inventory management system 102 is configured to identify interactions with and between users 108, devices such as sensors 118, robots, material handling equipment, computing devices, and so forth, in one or more of the receiving area 706, the storage area 708, or the transition area 706. These interactions may include one or more events 110. For example, events 110 may include the entry of the user 108 to the facility 102, stocking of items 106 at an inventory location 112, picking of an item 106 from an inventory location 112, returning of an item 106 to an inventory location 112, placement of an item 106 within a tote 104, movement of users 108 relative to one another, gestures by the users 108, and so forth. Other events 110 involving users 108 may include the user 108 providing authentication information in the facility 102, using a computing device at the facility 102 to authenticate identity to the inventory management system 102, and so forth. Some events 110 may involve one or more other objects within the facility 102. For example, the event 110 may comprise movement within the facility 102 of an inventory location 112, such as a counter mounted on wheels. Events 110 may involve one or more of the sensors 118. For example, a change in operation of a sensor 118, such as a sensor failure, change in alignment, and so forth, may be designated as an event 110. Continuing the example, movement of an imaging sensor 118(1) resulting in a change in the orientation of the field of view (such as resulting from someone or something bumping the imaging sensor 118(1)) may be designated as an event 110.

By determining the occurrence of one or more of the events 110, the inventory management system 102 may generate output data 710. The output data 710 comprises information about the event 110. For example, where the event 110 comprises an item 106 being removed from an inventory location 112, the output data 710 may comprise an item identifier indicative of the particular item 106 that was removed from the inventory location 112 and a user identifier of a user 108 that removed the item 106.

The inventory management system 102 may use one or more automated systems to generate the output data 710. For example, an artificial neural network, one or more classifiers, or other automated machine learning techniques may be used to process the sensor data from the one or more sensors 118 to generate output data 710. The automated systems may operate using probabilistic or non-probabilistic techniques. For example, the automated systems may use a Bayesian network. In another example, the automated systems may use support vector machines to generate the output data 710 or the tentative results. The automated systems may generate confidence value data that provides information indicative of the accuracy or confidence that the output data 710 or the tentative data corresponds to the physical world.

The confidence value data may be generated using a variety of techniques, based at least in part on the type of automated system in use. For example, a probabilistic system using a Bayesian network may use a probability assigned to the output as the confidence value. Continuing the example, the Bayesian network may indicate that the probability that the item depicted in the image data corresponds to an item previously stored in memory is 95%. This probability may be used as the confidence value for that item as depicted in the image data.

In another example, output from non-probabilistic techniques such as support vector machines may have confidence values based on a distance in a mathematical space within which the image data of the item and the images of previously stored items have been classified. The greater the distance in this space from a reference point such as the previously stored image to the image data acquired during the occurrence, the lower the confidence value.

In yet another example, the image data of an object such as an item 106, user 108, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence value may be determined based at least in part on these differences. For example, the user 108 may pick an item 106(1) such as a perfume bottle that is generally cubical in shape from the inventory location 112. Other items 106 at nearby inventory locations 112 may be predominately spherical. Based on the difference in shape (cube vs. sphere) from the adjacent items, and the correspondence in shape with the previously stored image of the perfume bottle item 106(1) (cubical and cubical), the confidence value that the user 114 has picked up the perfume bottle item 106(1) is high.

In some situations, the automated techniques may be unable to generate output data 710 with a confidence value above a threshold result. For example, the automated techniques may be unable to distinguish which user 108 in a crowd of users 108 has picked up the item 106 from the inventory location 112. In other situations, it may be desirable to provide human confirmation of the event 110 or of the accuracy of the output data 710. For example, some items 106 may be deemed age restricted such that they are to be handled only by users 108 above a minimum age threshold.

In instances where human confirmation is desired, sensor data associated with an event 110 may be processed to generate inquiry data. The inquiry data may include a subset of the sensor data associated with the event 110. The inquiry data may also include one or more of one or more tentative results as determined by the automated techniques, or supplemental data. The subset of the sensor data may be determined using information about the one or more sensors 118. For example, camera data such as the location of the imaging sensor 118(1) within the facility 102, the orientation of the imaging sensor 118(1), and a field of view of the imaging sensor 118(1) may be used to determine if a particular location within the facility 102 is within the field of view. The subset of the sensor data may include images that may show the inventory location 112 or that the item 106 was stowed. The subset of the sensor data may also omit images from other imaging sensors 118(1) that did not have that inventory location 112 in the field of view. The field of view may comprise a portion of the scene in the facility 102 that the sensor 118 is able to generate sensor data about.

Continuing the example, the subset of the sensor data may comprise a video clip acquired by one or more imaging sensors 118(1) having a field of view that includes the item 106. The tentative results may comprise the "best guess" as to which items 106 may have been involved in the event 110. For example, the tentative results may comprise results determined by the automated system that have a confidence value above a minimum threshold.

Furthermore, when a result of an event record is determined to be below a threshold confidence result, prior to sending the sensor data associated with the event 110 to the human associate, the inventor management system 102 may determine whether the record of the event 110 is to be merged with any other event records. If so, the inventor management system 102 may store an indication of the merged event and may send the user interface comprising inquiry data (e.g., a video clip, etc.) associated with the entire merged event to the computing device of the human associate.

In some instances, the user interface may also include supplemental data, such as the weight of the item 106, bounding boxes or other visual cues to overlay or that have been inserted into the video clip for presentation, and so forth. The inquiry data is provided to a device associated with an associate. For example, the device may comprise a tablet computer, laptop computer, personal computer, set-top box, and so forth. The device presents an associate user interface based at least in part on the inquiry data. Continuing the example, the associate user interface may present the video clip of the item 106 being removed from the inventory location 112. One or more of the tentative results associated with the identity of the item 106 may also be presented in the associate user interface. The associate may view the video clip and the supplemental data and make a selection from the tentative results to identify the item 106 was removed from the inventory location 112. The selection or other information generated by the associate comprises response data. The response data from one or more associates may be processed to generate the output data 710. For example, the majority of the associates may identify the item 106 that was picked from the inventory location 112 as "5 oz box powdered toast". Based at least in part on the majority selection, the inventory management system 102 may generate output data 710 indicating that the item 106 picked was "5 oz box powdered toast".

The facility 102 may be configured to receive different kinds of items 106 from various suppliers and to store them until a customer orders or retrieves one or more of the items 106. A general flow of items 106 through the facility 102 is indicated by the arrows of FIG. 4. Specifically, as illustrated in this example, items 106 may be received from one or more suppliers, such as manufacturers, distributors, wholesalers, and so forth, at the receiving area 706. In various implementations, the items 106 may include merchandise, commodities, perishables, or any suitable type of item 106, depending on the nature of the enterprise that operates the facility 102. The receiving of the items 106 may comprise one or more events 110 for which the inventory management system 102 may generate output data 710.

Upon being received from a supplier at receiving area 706, the items 106 may be prepared for storage. For example, items 106 may be unpacked or otherwise rearranged. The inventory management system 102 may include one or more software applications executing on a computer system to provide inventory management functions based on the events 110 associated with the unpacking or rearrangement. These inventory management functions may include maintaining information indicative of the type, quantity, condition, cost, location, weight, or any other suitable parameters with respect to the items 106. The items 106 may be stocked, managed, or dispensed in terms of countable, individual units or multiples, such as packages, cartons, crates, pallets, or other suitable aggregations. Alternatively, some items 106, such as bulk products, commodities, and so forth, may be stored in continuous or arbitrarily divisible amounts that may not be inherently organized into countable units. Such items 106 may be managed in terms of measurable quantity such as units of length, area, volume, weight, time, duration, or other dimensional properties characterized by units of measurement. Generally speaking, a quantity of an item 106 may refer to either a countable number of individual or aggregate units of an item 106 or a measurable amount of an item 106, as appropriate.

After arriving through the receiving area 706, items 106 may be stored within the storage area 708. In some implementations, like items 106 may be stored or displayed together in the inventory locations 112 such as in bins, on shelves, hanging from pegboards, and so forth. In this implementation, all items 106 of a given kind are stored in one inventory location 112. In other implementations, like items 106 may be stored in different inventory locations 112. For example, to optimize retrieval of certain items 106 having frequent turnover within a large physical facility 102, those items 106 may be stored in several different inventory locations 112 to reduce congestion that might occur at a single inventory location 112. Storage of the items 106 and their respective inventory locations 112 may comprise one or more events 110.

When a customer order specifying one or more items 106 is received, or as a user 108 progresses through the facility 102, the corresponding items 106 may be selected or "picked" from the inventory locations 112 containing those items 106. In various implementations, item picking may range from manual to completely automated picking. For example, in one implementation, a user 108 may have a list of items 106 they desire and may progress through the facility 102 picking items 106 from inventory locations 112 within the storage area 708, and placing those items 106 into a tote 104. In other implementations, employees of the facility 102 may pick items 106 using written or electronic pick lists derived from customer orders. These picked items 106 may be placed into the tote 104 as the employee progresses through the facility 102. Picking may comprise one or more events 110, such as the user 108 in moving to the inventory location 112, retrieval of the item 106 from the inventory location 112, and so forth.

After items 106 have been picked, they may be processed at a transition area 706. The transition area 706 may be any designated area within the facility 102 where items 106 are transitioned from one location to another or from one entity to another. For example, the transition area 706 may be a packing station within the facility 102. When the item 106 arrives at the transition area 706, the items 106 may be transitioned from the storage area 708 to the packing station. The transitioning may comprise one or more events 110. Information about the transition may be maintained by the inventory management system 102 using the output data 710 associated with those events 110.

In another example, if the items 106 are departing the facility 102 a list of the items 106 may be obtained and used by the inventory management system 102 to transition responsibility for, or custody of, the items 106 from the facility 102 to another entity. For example, a carrier may accept the items 106 for transport with that carrier accepting responsibility for the items 106 indicated in the list. In another example, a customer may purchase or rent the items 106 and remove the items 106 from the facility 102. The purchase or rental may comprise one or more events 110.

During use of the facility 102, the user 108 may move about the facility 102 to perform various tasks, such as picking or placing the items 106 in the inventory locations 112. Pluralities of users 108 may move past one another, travel in groups, may coalesce into groups, groups may break apart, and so forth. These movements may comprise one or more events 110. For example, an event 110 may comprise a plurality of users 108 moving past one another in the aisle 708.

The inventory management system 102 may access or generate sensor data about the facility 102 and the contents therein including the items 106, the users 108, the totes 104, and so forth. The sensor data may be acquired by one or more of the sensors 118, data provided by other systems, and so forth. For example, the sensors 118 may include cameras 118(1) configured to acquire image data of scenes in the facility 102. The image data may comprise still images, video, or a combination thereof. The image data may be processed by the inventory management system 102 to determine a location of the user 108, the tote 104, the identity of the user 108, and so forth. As used herein, the identity of the user may represent a unique identifier of the user (e.g., name, number associated with user, username, etc.), an identifier that distinguishes the user amongst other users being tracked with the environment, or the like. The sensors 118 are discussed in more detail below.

The inventory management system 102, or systems coupled thereto, may be configured to identify the user 108, as well as to determine other candidate users. In one implementation, this determination may comprise comparing sensor data with previously stored identity data. For example, the user 108 may be identified by showing their face to a facial recognition system, by presenting a token carrying authentication credentials, providing a fingerprint, scanning a barcode or other type of unique identifier upon entering the facility, and so forth. Identity of the user 108 may be determined before, during, or after entry to the facility 102. Determination of the user's 108 identity may comprise comparing sensor data associated with the user 108 in the facility 102 to previously stored user data.

In some instances, the inventory management system group users within the facility into respective sessions. That is, the inventory management system 102 may utilize the sensor data to determine groups of users that are effectively "together" (e.g., shopping together). In some instances, a particular session may include multiple users that entered the facility 102 together and, potentially, that navigate the facility together. For example, when a family of two adults and two children enter the facility together, the inventory management system may associate each user with a particular session. Locating sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 104. Noting the child and the mother as belonging to the same session may increase the chances of successfully adding the box of cereal to the virtual shopping cart of the mother.

By determining the occurrence of one or more events 110 and the output data 710 associated therewith, the inventory management system 102 is able to provide one or more services to the users 108 of the facility 102. By utilizing one or more human associates to process inquiry data and generate response data that may then be used to produce output data 710, overall accuracy of the system may be enhanced. The enhanced accuracy may improve the user experience of the one or more users 108 of the facility 102.

The facility 102 may be connected to one or more networks 122, which in turn connect to one or more servers 120. The network 122 may include private networks such as an institutional or personal intranet, public networks such as the Internet, or a combination thereof. The network 122 may utilize wired technologies (e.g., wires, fiber optic cable, and so forth), wireless technologies (e.g., radio frequency, infrared, acoustic, optical, and so forth), or other connection technologies. The network 122 is representative of any type of communication network, including one or more of data networks or voice networks. The network 122 may be implemented using wired infrastructure (e.g., copper cable, fiber optic cable, and so forth), a wireless infrastructure (e.g., cellular, microwave, satellite), or other connection technologies.

The servers 120 may be configured to execute one or more modules or software applications associated with the inventory management system 126. While the servers 120 are illustrated as being in a location outside of the facility 102, in other implementations, at least a portion of the servers 120 may be located at the facility 102. The servers 120 are discussed in more detail below with regard to FIG. 8.

The users 106, the totes 104, or other objects in the facility 102 may be equipped with one or more tags, such as radio frequency (RF) tags. The tags may be configured to emit a signal. In one implementation, the tag may be a radio frequency identification (RFID) tag configured to emit a RF signal upon activation by an external signal. For example, the external signal may comprise a radio frequency signal or a magnetic field configured to energize or activate the RFID tag. In another implementation, the tag may comprise a transmitter and a power source configured to power the transmitter. For example, the tag may comprise a Bluetooth Low Energy (BLE) transmitter and battery. In other implementations, the tag may use other techniques to indicate presence. For example, an acoustic tag may be configured to generate an ultrasonic signal which is detected by corresponding acoustic receivers. In yet another implementation, the tag may be configured to emit an optical signal.

The inventory management system 126 may be configured to use the tags for one or more of identification of the object, determining a location of the object, and so forth. For example, the users 106 may wear tags, the totes 104 may have tags affixed, and so forth, which may be read and, based at least in part on signal strength, used to determine identity and location. Generally, the inventory management system 126 or other systems associated with the facility 102 may include any number and combination of input components, output components, and servers 120.

The one or more sensors 118 may be arranged at one or more locations within the facility 102. For example, the sensors 118 may be mounted on or within a floor, wall, at a ceiling, at an inventory location 112, on the tote 104, may be carried or worn by the user 106, and so forth. The sensors 118 produce respective sensor data.

The sensors 118 may include one or more imaging sensors 118(1). These imaging sensors 118(1) may include cameras configured to acquire images of a scene. The imaging sensors 118(1) are configured to detect light in one or more wavelengths including, but not limited to, terahertz, infrared, visible, ultraviolet, and so forth. The imaging sensors 118(1), as well as any image sensors described herein, may provide sensor data in the form of the image data, in the form of indications of what item was picked or return and the location of the item, combinations thereof, and/or the like. The inventory management system 126 may use image data acquired by the imaging sensors 118(1) during operation of the facility 102. For example, the inventory management system 126 may identify items 106, identify users 106, identify totes 104, determine a location, and so forth, based at least in part on their appearance within the image data.

One or more three-dimensional (3D) sensors 118(2) may also be included in the sensors 118. The 3D sensors 118(2) are configured to acquire spatial or 3D data, such as depth information, about objects within a sensor field-of-view. The 3D sensors 118(2) include range cameras, lidar systems, sonar systems, radar systems, structured light systems, stereo vision systems, optical interferometry systems, and so forth. The inventory management system 126 may use the 3D data acquired to identify objects, determine a location of an object, and so forth. For example, the inventory management system 126 may determine operational data such as location in the facility 102 of the user 106 based at least in part on the location in 3D space of the user 106.

One or more buttons 118(3) are configured to accept input from the user 106. The buttons 118(3) may comprise mechanical, capacitive, optical, or other mechanisms. For example, the buttons 118(3) may comprise mechanical switches configured to accept an applied force from a touch of the user 106 to generate an input signal. The inventory management system 126 may use data from the buttons 118(3) to receive information from the user 106 and produce button data.

The sensors 118 may include one or more touch sensors 118(4). The touch sensors 118(4) may use resistive, capacitive, surface capacitance, projected capacitance, mutual capacitance, optical, Interpolating Force-Sensitive Resistance (IFSR), or other mechanisms to determine the position of a touch or near-touch and generate touch sensor data. For example, the IFSR may comprise a material configured to change electrical resistance responsive to an applied force. The position within the material of that change in electrical resistance may indicate the position of the touch. The inventory management system 126 may use data from the touch sensors 118(4) to receive information from the user 106. For example, the touch sensor 118(4) may be integrated with the tote 104 to provide a touchscreen with which the user 106 may select from a menu one or more particular items 106 for picking.

One or more microphones 118(5) may be configured to acquire information indicative of sound present in the environment and generate audio data. In some implementations, arrays of microphones 118(5) may be used. These arrays may implement beamforming techniques to provide for directionality of gain. The inventory management system 126 may use the one or more microphones 118(5) to acquire information from acoustic tags, accept voice input from the users 106, determine the location of one or more users 106 in the facility 102, determine ambient noise level, and so forth.

One or more weight sensors 118(6) are configured to measure the weight of a load, such as the item 106, the user 106, the tote 104, and so forth and generate weight data. The weight sensors 118(6) may be configured to measure the weight of the load at one or more of the inventory locations 112, the tote 104, or on the floor of the facility 102. The weight sensors 118(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers, which generate one or more signals based on an applied force, such as that of the load due to gravity. The inventory management system 126 may use the data acquired by the weight sensors 118(6) to identify an object, determine a location of an object, maintain shipping records, identify the user 106, and so forth. In addition to the weight data, the weight sensors 118(6) may send an indication of an item picked or returned and a location of the item, an indication of a cost of an item removed, combinations there, and/or the like. Further, each of the sensors 118 may provide this type of data.

The sensors 118 may include one or more light sensors 118(7) configured to generate light sensor data. The light sensors 118(7) may be configured to provide information associated with ambient lighting conditions such as a level of illumination. Information acquired by the light sensors 118(7) may be used by the inventory management system 126 to adjust a level, intensity, or configuration of the user interface.

One more radio frequency identification (RFID) readers 118(8), near field communication (NFC) systems, and so forth, may also be provided in the sensors 118. For example, the RFID readers 118(8) may be configured to read the tags and generate RFID tag data. Information acquired by the RFID reader 118(8) may be used by the inventory management system 126 to identify an object associated with the tag such as the item 106, the user 106, the tote 104, and so forth. For example, based on information from the RFID readers 118(8), a velocity of the tag may be determined.

One or more RF receivers 118(9) may also be provided in the sensors 118 to generate radio-frequency data. In some implementations, the RF receivers 118(9) may be part of transceiver assemblies. The RF receivers 118(9) may be configured to acquire RF signals associated with Wi-Fi™, Bluetooth®, ZigBee®, Z-Wave, 3G, 4G, LTE, or other wireless data transmission technologies. The RF receivers 118(9) may provide information associated with data transmitted via radio frequencies, signal strength of RF signals, and so forth. For example, information from the RF receivers 118(9) may be used by the inventory management system 126 to determine a location of an RF source, such as a communication interface onboard the tote 104 or carried by the user 106.

The sensors 118 may include one or more accelerometers 118(10) that may be worn or carried by the user 106, mounted to the tote 104, and so forth. The accelerometers 118(10) may provide accelerometer data such as the direction and magnitude of an imposed acceleration. Data such as rate of acceleration, determination of changes in direction, speed, and so forth, may be determined using the accelerometers 118(10).

A gyroscope 118(11) provides gyroscope data indicative of rotation of an object affixed thereto. For example, the tote 104, the user 106, or other objects may be equipped with a gyroscope 118(11) to provide data indicative of a change in orientation.

A magnetometer 118(12) may be used to determine an orientation by measuring ambient magnetic fields, such as the terrestrial magnetic field. The magnetometer 118(12) may generate magnetometer data indicative of the direction, strength, and so forth of a magnetic field. The magnetometer 118(12) may be worn or carried by the user 106, mounted to the tote 104, and so forth. For example, the magnetometer 118(12) mounted to the tote 104 may act as a compass and provide information indicative of which way the tote 104 is oriented.

The sensors 118 may include other sensors 118(S) as well. For example, the other sensors 118(S) may include proximity sensors, ultrasonic rangefinders, thermometers, barometric sensors, hygrometers, biometric input devices including, but not limited to, fingerprint readers or palm scanners, and so forth. For example, the inventory management system 126 may use information acquired from thermometers and hygrometers in the facility 102 to direct the user 106 to check on delicate items 106 stored in a particular inventory location 112.

The facility 102 may include one or more access points configured to establish one or more wireless networks and the network 122. The access points may use Wi-Fi™, NFC, Bluetooth®, or other technologies to establish wireless communications between a device and the network 122. The wireless networks allow the devices to communicate with one or more of the inventory management system 126, the sensors 118, the tag, a communication device of the tote 104, or other devices.

In some examples, the totes 104 may include one or more sensors 712 to acquire information in the facility 102. The sensors in the facility 102 (e.g., sensors 118) may include sensors fixed in the environment (e.g., ceiling-mounted cameras) or otherwise, such as sensors in the possession of users (e.g., mobile phones, tablets, etc.) or sensors mounted on the totes 104 (e.g., tote sensors 712). The tote sensors 712 may include proximity sensors 712(1) to detect items 106 being placed in the tote 104, inward-facing imaging sensors 712(3) to identify items 106 being placed in the tote, communication interfaces, weight sensors 712(4) (e.g., in the bottom of the tote), light sensors 712(2), outward facing sensors 712(3), radio frequency (RF), temperature sensors, humidity sensors, vibration sensors, and so forth. The sensors may be, in some examples, in or on the tote 104 or another location in the facility 102. In one example, the bottom of the totes 104 may include weight sensors configured to determine a weight of the items 106 placed thereupon.

During operation of the facility 102, the sensors may be configured to provide information suitable for identifying the movement of items 106 or other occurrences within the tote 104. For example, a series of images acquired by a camera 712(3) may indicate removal of an item 106 from a particular tote 104 by one of the users 108 and/or placement of the item 106 on or at least partially within one of the totes 104.

The totes 104 may include or be associated with a tote-management system that may access or generate sensor data about the items 106, the users 108, the totes 104, and so forth. The sensor data may be acquired by one or more of the sensors 712, data provided by other systems, and so forth. For example, the sensors may include cameras configured to acquire image data of items 106 placed in the totes 104. The image data may comprise still images, video, or a combination thereof. The image data may be processed by the tote management system to determine an item identifier for the items 106, a listing of items in the tote 104 for a user 108, and so forth. As used herein, the identity of the user of a tote 104 may represent a unique identifier of the user (e.g., name, number associated with user, username, etc.), an identifier that distinguishes the user amongst other users being identified with the environment, or the like.

The tote-management system, or systems coupled thereto, may be configured to identify the user 108. In one implementation, this determination may comprise comparing sensor data with previously stored identity data. For example, the user 108 may be identified by showing their face to a facial recognition system, by presenting a token carrying authentication credentials, providing a fingerprint, scanning a barcode or other type of unique identifier upon entering the facility, and so forth. Identity of the user 108 may be determined before, during, or after entry to the facility 102 and/or interaction with a tote 104. Determination of the user's identity may comprise comparing sensor data associated with the user 108 in the facility 102 and/or with the tote 104 to previously stored user data. In some examples, the output data 710 may be transmitted over a network 122 to server(s) 120.

Figure 8:
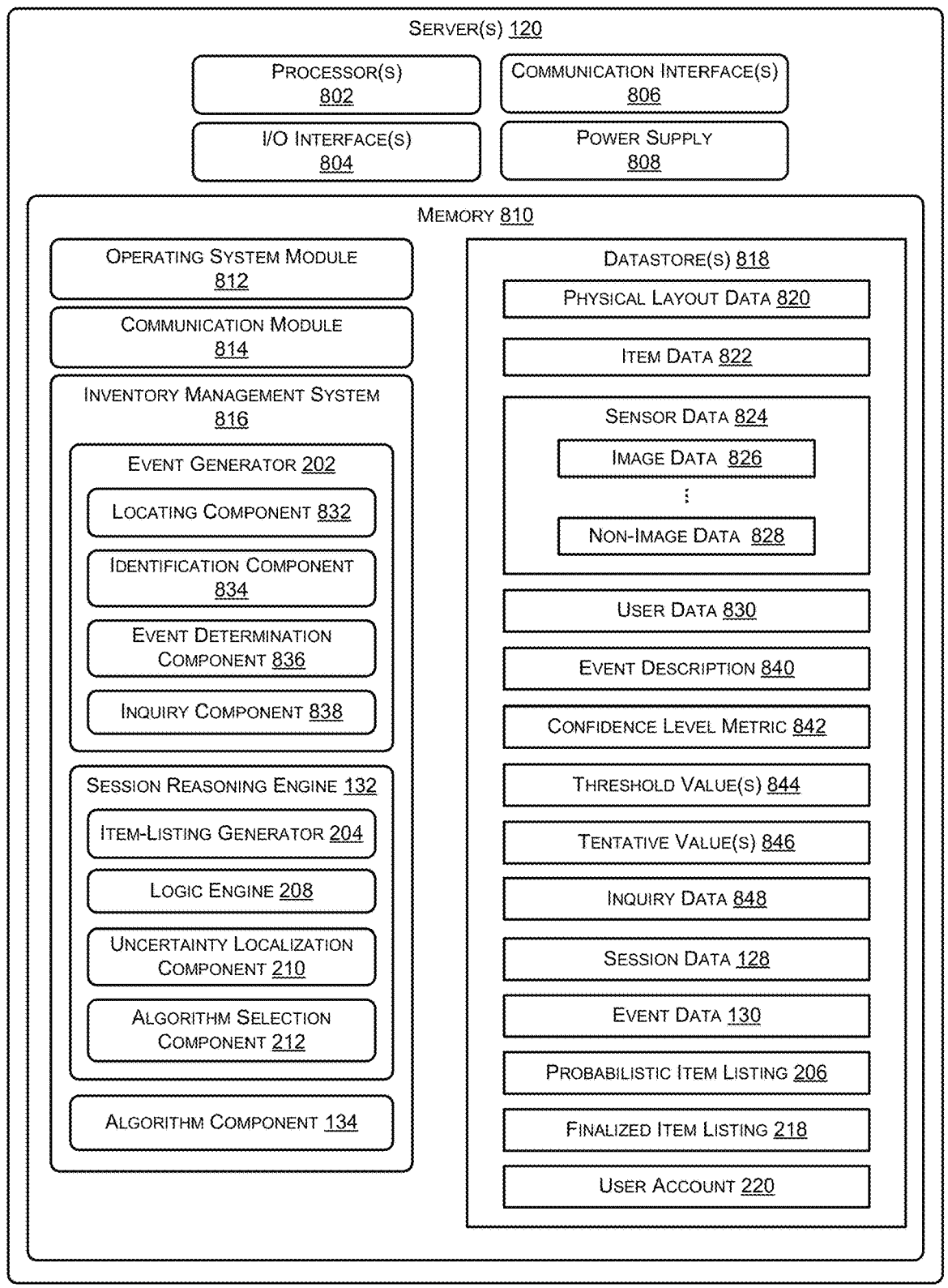
FIG. 8 illustrates a block diagram of one or more servers configured to support operation of the facility. As illustrated, the servers may host an inventory management system configured to use components of a session reasoning engine to determine listings of items taken by users from the facility.

FIG. 8 illustrates a block diagram of one or more servers 120 configured to support operation of the facility 102. As illustrated, the servers 120 may host an inventory management system 126 configured to use components of a session reasoning engine 132 to determine listings of items 106 taken by users 108 from the facility 102.

The server 120 may be physically present at the facility 102, may be accessible by the network 122, or a combination of both. The server 120 does not require end-user knowledge of the physical location and configuration of the system that delivers the services. Common expressions associated with the server 120 may include "on-demand computing," "software as a service (SaaS)," "platform computing," "network-accessible platform," "cloud services," "data centers," and so forth. Services provided by the server 120 may be distributed across one or more physical or virtual devices.

The server 120 may include one or more hardware processors 802 (processors) configured to execute one or more stored instructions. The processors 802 may comprise one or more cores. The server 120 may include one or more input/output (I/O) interface(s) 804 to allow the processor 802 or other portions of the server 120 to communicate with other devices. The I/O interfaces 804 may comprise Inter-Integrated Circuit (I2C), Serial Peripheral Interface bus (SPI), Universal Serial Bus (USB) as promulgated by the USB Implementers Forum, RS-282, and so forth.

The I/O interface(s) 804 may couple to one or more I/O devices 806. The I/O devices 806 may include input devices such as the sensors 116, one or more of a keyboard, mouse, scanner, and so forth. The I/O devices 806 may also include output devices such as one or more of a display, printer, audio speakers, and so forth. In some embodiments, the I/O devices 806 may be physically incorporated with the server 120 or may be externally placed.

The server 120 may also include one or more communication interfaces 808. The communication interfaces 808 are configured to provide communications between the server 120 and other devices, such as the sensors 116, the interface devices, routers, access points, and so forth. The communication interfaces 808 may include devices configured to couple to personal area networks (PANs), wired and wireless local area networks (LANs), wired and wireless wide area networks (WANs), and so forth. For example, the communication interfaces 808 may include devices compatible with Ethernet, Wi-Fi™, and so forth.

The server 120 may also include one or more busses or other internal communications hardware or software that allow for the transfer of data between the various modules and components of the server 120.

As shown in FIG. 8, the server 120 includes one or more memories 810. The memory 810 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 810 provides storage of computer-readable instructions, data structures, program modules, and other data for the operation of the server 120. A few example functional modules are shown stored in the memory 810, although the same functionality may alternatively be implemented in hardware, firmware, or as a system on a chip (SOC).

The memory 810 may include at least one operating system (OS) component 812. The OS component 812 is configured to manage hardware resource devices such as the I/O interfaces 804, the I/O devices 806, the communication interfaces 808, and provide various services to applications or modules executing on the processors 802. The OS component 812 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following modules may also be stored in the memory 810. These modules may be executed as foreground applications, background tasks, daemons, and so forth.

A communication component 814 may be configured to establish communications with one or more of the sensors 116, one or more of the devices used by associates, other servers 120, or other devices. The communications may be authenticated, encrypted, and so forth.

The memory 810 may store an inventory management component 816. The inventory management component 816 is configured to provide the inventory functions as described herein with regard to the inventory management system 126. For example, the inventory management component 816 may track movement of items 106 in the facility 102, generate user interface data, and so forth.

The inventory management component 816 may access information stored in a data store 818 in the memory 810. The data store 818 may use a flat file, database, linked list, tree, executable code, script, or other data structure to store the information. In some implementations, the data store 818 or a portion of the data store 818 may be distributed across one or more other devices including other servers 120, network attached storage devices, and so forth.

The data store 818 may include physical layout data 820. The physical layout data 820 provides a mapping of physical locations within the physical layout of devices and objects such as the sensors 118, inventory locations 112, and so forth. The physical layout data 820 may indicate the coordinates within the facility 102 of an inventory location 112, sensors 118 within view of that inventory location 112, and so forth. For example, the physical layout data 820 may include camera data comprising one or more of a location within the facility 102 of an imaging sensor 116, orientation of the imaging sensor 116, the operational status, and so forth. Continuing example, the physical layout data 820 may indicate the coordinates of the imaging sensor 116, pan and tilt information indicative of a direction that the field of view is oriented along, whether the imaging sensor 116 is operating or malfunctioning, and so forth.

In some implementations, the inventory management component 816 may access the physical layout data 820 to determine if a location associated with the event 110 is within the field of view of one or more sensors 116/118. Continuing the example above, given the location within the facility 102 of the event 110 and the camera data, the inventory management component 816 may determine the imaging sensors 116 that may have generated images of the event 110.

The item data 822 comprises information associated with the items 106. The information may include information indicative of one or more inventory locations 114 at which one or more of the items 106 are stored. The item data 822 may also include order data, SKU or other product identifier, price, quantity on hand, weight, expiration date, images of the item 106, detail description information, ratings, ranking, and so forth. The inventory management component 816 may store information associated with inventory management functions in the item data 822.

The data store 818 may also include sensor data 824. The sensor data 824 comprises information acquired from, or based on, the one or more sensors 116. For example, the sensor data 824 may comprise 8D information about an object in the facility 102. As described above, the sensors 118 may include an imaging sensor 116, which is configured to acquire one or more images. These images may be stored as the image data 826. The image data 826 may comprise information descriptive of a plurality of picture elements or pixels. Non-image data 828 may comprise information from other sensors 118, such as input from the microphones 118(5), weight sensors 118(6), and so forth.

User data 880 may also be stored in the data store 818. The user data 880 may include identity data, information indicative of a profile, purchase history, location data, images of the user 108, demographic data, and so forth. Individual users 108 or groups of users 108 may selectively provide user data 880 for use by the inventory management system 126. The individual users 108 or groups of users 108 may also authorize collection of the user data 880 during use of the facility 102 or access to user data 880 obtained from other systems. For example, the user 108 may opt-in to collection of the user data 880 to receive enhanced services while using the facility 102.

In some implementations, the user data 880 may include information designating a user 108 for special handling. For example, the user data 880 may indicate that a particular user 108 has been associated with an increased number of errors with respect to output data 710. The inventory management component 816 may be configured to use this information to apply additional scrutiny to the events 110 associated with this user 108. For example, events 110 that include an item 106 having a cost or value above the threshold amount may be provided to the associates for processing regardless of the determined level of confidence in the output data 710 as generated by the automated system.

The inventory management component 816 may include one or more of a locating component 882, identification component 884, event determination component 886, or inquiry component 888. The locating component 882 may be configured to track one or more objects associated with the facility 102. For example, the locating component 882 may access the sensor data 824 to determine location data.

The location data provides information indicative of a location of an object, such as the item 106, the user 108, the tote 104, and so forth. The location may be absolute with respect to the facility 102 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 102, 5.2 m from an inventory location 112 along a heading of 169°, and so forth. For example, the location data may indicate that the user 108(1) is 25.2 m along the aisle and standing in front of the inventory location 112. In comparison, a relative location may indicate that the user 108(1) is 82 cm from the tote 104 at a heading of 78° with respect to the tote 104. The location data may include orientation information, such as which direction the user 108 is facing. The orientation may be determined by the relative direction the user's 108 body is facing. In some implementations, the orientation may be relative to the interface device. Continuing the example, the location data may indicate that the user 108(1) is oriented with a heading of 0°, or looking north. In another example, the location data may indicate that the user 108 is facing towards the interface device.

The identification component 884 is configured to identify an object. In one implementation, the identification component 884 may be configured to identify an item 106. In another implementation, the identification component 884 may be configured to identify the user 108. For example, the identification component 884 may use facial recognition techniques to process the image data 826 and determine the identity data of the user 108 depicted in the images by comparing the characteristics in the image data 826 with previously stored values. The identification component 884 may also access data from other sensors 118, such as from the RFID reader 118(8), the RF receiver 118(9), fingerprint sensors, and so forth.

Facial recognition may include analyzing facial characteristics which are indicative of one or more facial features in an image, 8D data, or both. For example, the face of the user 108 may be detected within one or more of the images of the image data 826. The facial features include measurements of, or comparisons between, facial fiducials or ordinal points. The facial features may include eyes, mouth, lips, nose, chin, ears, face width, skin texture, 8D shape of the face, presence of eyeglasses, and so forth. In some implementations, the facial characteristics may include facial metrics. The facial metrics indicate various ratios of relative sizes and spacing of the facial features. For example, the facial metrics may include a ratio of interpupillary distance to facial width, ratio of eye width to nose width, and so forth. In some implementations, the facial characteristics may comprise a set of eigenvectors by using principal component analysis (PCA) on a set of images. These eigenvectors, as descriptive of a human face, may be known as "eigenfaces" or "eigenimages".

In one implementation, the facial recognition described in this disclosure may be performed, at least in part, using one or more tools available in the OpenCV library as developed by Intel Corporation of Santa Clara, California, USA; Willow Garage of Menlo Park, California, USA; and Itseez of Nizhny Novgorod, Russia, with information available at www.opencv.org. In other implementations, other techniques may be used to recognize faces. Previously stored registration data may associate particular facial characteristics with a particular identity, such as represented by a user account. For example, the particular pattern of eigenvectors in the image may be sought in the previously stored data, and matches within a threshold tolerance may be determined to indicate identity of the user 108. The eigenvectors or other measurements may be compared with previously stored characteristics to determine the user data 880 of the person in the image or to distinguish one user 108 from another.

The event determination component 886 is configured to process the sensor data 824 and generate output data 710. The event determination component 886 may access information stored in the data store 818 including, but not limited to, event description data 840, confidence level metrics 842, or threshold values 844.

The event description data 840 comprises information indicative of one or more events 110. For example, the event description data 840 may comprise predefined profiles that designate movement of an item 106 from an inventory location 112 with the event 110 of "pick". The event description data 840 may be manually generated or automatically generated. The event description data 840 may include data indicative of triggers associated with events occurring in the facility 102. An event may be determined as occurring upon detection of the trigger. For example, sensor data 824 such as a change in weight from a weight sensor 118(6) at an inventory location 112 may trigger detection of an event of an item 106 being added or removed from the inventory location 112. In another example, the trigger may comprise an image of the user 108 reaching a hand toward the inventory location 112. In yet another example, the trigger may comprise two or more users 108 approaching to within a threshold distance of one another.

The event determination component 886 may process the sensor data 824 using one or more techniques including, but not limited to, artificial neural networks, classifiers, decision trees, support vector machines, Bayesian networks, and so forth. For example, the event determination component 886 may use a decision tree to determine occurrence of the "pick" event 110 based on sensor data 824. The event determination component 886 may further use the sensor data 824 to determine one or more tentative values 846. The one or more tentative values 846 comprise data associated with the event 110. For example, where the event 110 comprises a disambiguation of users 108, the tentative values 846 may comprise a list of possible user 108 identities. In another example, where the event 110 comprises a disambiguation between items 106, the tentative values 846 may comprise a list of possible item identifiers. In some implementations, the tentative value 846 may indicate the possible action. For example, the action may comprise the user 108 picking, placing, moving an item 106, damaging an item 106, providing gestural input, and so forth.

In some implementations, the tentative values 846 may be generated by other components. For example, the tentative values 846 such as one or more possible identities or locations of the user 108 involved in the event 110 may be generated by the locating component 882. In another example, the tentative values 846 such as possible items 106 that may have been involved in the event 110 may be generated by the identification component 884.

The event determination component 886 may be configured to provide a confidence level metric 842 associated with the determination of the tentative values 846. The confidence level metric 842 provides indicia as to the expected level of accuracy of the tentative value 846. For example, a low confidence level metric 842 may indicate that the tentative value 846 has a low probability of corresponding to the actual circumstances of the event 110. In comparison, a high confidence level metric 842 may indicate that the tentative value 846 has a high probability of corresponding to the actual circumstances of the event 110.

In some implementations, the tentative values 846 having confidence level metrics 842 that exceed the threshold value 844 may be deemed to be sufficiently accurate and thus may be used as the output data 126. For example, the event determination component 886 may provide tentative values 846 indicative of the three possible items 106(1), 106(2), and 106(3) corresponding to the "pick" event 110. The confidence level metrics 842 associated with the possible items 106(1), 106(2), and 106(3) may be 25%, 70%, 92%, respectively. Continuing the example, the threshold value 844 may be set such that confidence level metrics 842 of 90% are deemed to be sufficiently accurate. As a result, the event determination component 886 may designate the "pick" event 110 as involving item 106(3).

In situations where the event determination component 886 determines that the confidence level metric 842 associated with the tentative value 846 is below a threshold value 844, the inquiry component 888 may be utilized. In other situations, such as where verification by human operator is desired, the inquiry component 888 may also be utilized.

The inquiry component 888 may be configured to use at least a portion of the sensor data 824 associated with the event 110 to generate inquiry data 848. In some implementations, the inquiry data 848 may include one or more of the tentative values 846 or supplemental data 850. The inquiry component 888 may be configured to provide inquiry data 848 to one or more devices associated with one or more human associates.

An associate user interface is presented on the respective devices of associates. The associate may generate response data 852 by selecting a particular tentative value 846, entering new information, indicating that they are unable to answer the inquiry, and so forth.

The inquiry component 888 processes the response data 852 provided by the one or more associates. The processing may include calculating one or more statistical values associated with the response data 852. For example, statistical values may include a count of the number of times associates selected a particular tentative value 846, determination of a percentage of the associates that selected a particular tentative value 846, and so forth.

Other components may also be present in the memory 810. For example, an accounting module may be configured to generate information indicative of a cost of goods picked by the user 108. Other data may also be stored in the data store 818. For example, the other data may comprise the cost of goods picked by the user 108, payment information, and so forth.

The server 120 may also include a power supply 808. The power supply 808 is configured to provide electrical power suitable for operating the components in the server 120.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system comprising:
one or more sensors configured to generate sensor data indicative of at least a first event and a second event occurring during a time period in which a user is in a facility, wherein the one or more sensors include:
a camera configured to generate image data representing a first inventory location; and
a weight sensor configured to generate weight data associated with the first inventory location;
one or more processors; and
one or more computer-readable media storing computer-executable instructions that, when executed, cause the one or more processors to:
determine, using the sensor data, a first hypothesis of the first event, the first hypothesis indicating that the user removed a first quantity of a first item from a first inventory location in the facility;
determine a first confidence value indicating a first estimation of accuracy of the first hypothesis;
determine, using the image data, a second hypothesis of the second event by analyzing the image data to identify a second item, the second hypothesis indicating that the user removed a second quantity of the second item from a second inventory location in the facility;

determine, using the sensor data, a third hypothesis of the second event, the third hypothesis indicating that the user removed a third quantity of the second item from the second inventory location in the facility;

determine a second confidence value indicating a second estimation of accuracy of the second hypothesis;

determine a third confidence value indicating a third estimation of accuracy of the third hypothesis;

generate a first listing of item identifiers corresponding to items taken by the user during the time period, the first listing of item identifiers including:
  a first item identifier corresponding to the first item and a first probability value indicating a first likelihood that the first quantity of the first item was taken by the user; and
  a second item identifier corresponding to the second item, a second probability value indicating a second likelihood that the second quantity of the second item was taken by the user, and a third probability value indicating a third likelihood that the third quantity of the second item was taken by the user;

determine that the second probability value is less than a threshold;

determine that resolving the second event is more likely to increase an overall probability value for the first listing of item identifiers than resolving the first event;

prior to resolving the second event, determine a first expected information gain associated with using a first algorithm to resolve the second event;

prior to resolving the second event, determine a second expected information gain associated with using a second algorithm to resolve the second event;

prior to resolving the second event, select, from the first algorithm and the second algorithm, the first algorithm to resolve the second event based at least in part on the first expected information gain and the second expected information gain;

determine, using the first algorithm, that the second hypothesis is more accurate for the second event than the third hypothesis, the determining including:
  analyzing the weight data to identify a third event occurring during the time period that is related to the second event, the third event being identified based at least in part on a change in the weight data corresponding to a weight of the second item; and
  determining that an overall result of the second event and third event indicates that the user did not take the second item from the facility;

generate, based at least in part on the overall result, a second listing of item identifiers corresponding to items taken by the user during the time period, wherein the second listing of item identifiers does not include the second item;

determine that probability values included in the second listing of item identifiers are greater than or equal to the threshold; and store, in an account associated with the user, an indication of the second listing of item identifiers.

2. The system of claim 1, comprising further computer-executable instructions that, when executed, cause the one or more processors to:
  determine a first time at which the user entered the facility at a beginning of the time period; and
  determine a second time at which the user exited the facility at an end of the time period,
  wherein the sensor data is indicative of a plurality of events occurring during the time period in which the user was in the facility.

3. The system of claim 1, wherein the first listing of item identifiers further includes:
  a third probability value indicating a third likelihood that a third quantity of the first item was taken by the user; and
  a fourth probability value indicating a fourth likelihood that a fourth quantity of the second item was taken by the user,
  and wherein the system further comprises further computer-executable instructions that, when executed, cause the one or more processors to determine that the third probability value is less than the threshold.

4. The system of claim 1, comprising further computer-executable instructions that, when executed, cause the one or more processors to at least one of:
  determine an amount of computing resources to use the first algorithm to determine the second hypothesis is more accurate than the third hypothesis for the second event; or
  determine an amount of time taken to use the first algorithm to determine the second hypothesis is more accurate than the third hypothesis for the second event;
  wherein selecting the first algorithm is further based at least in part on at least one of the amount of computing resources or the amount of time.

5. A method comprising:
  accessing sensor data acquired by one or more sensors, the sensor data including image data generated by a camera representing a first inventory location and indicating a first event associated with a first item and a second event associated with a second item occurring during a time period in which one or more users are in a materials handling facility;
  determining, using the image data, a first hypothesis of the first event indicating that the image data represents the one or more users removing a first quantity of the first item from a first inventory location;
  determining, using the image data, a second hypothesis of the first event indicating that the image data represents the one or more users removing a second quantity of the first item from the first inventory location;
  determining, based at least in part on the first hypothesis and the second hypothesis, a first listing of items taken by the one or more users during the time period, the first listing of items including an identifier of the first item and an identifier of the second item;
  determining a first probability value indicating a first estimation of accuracy associated with the first listing of items;
  determining that the first probability value is less than a threshold;
  prior to using a first algorithm, determining a first expected improvement in the first probability value associated with the first algorithm;
  prior to using a second algorithm, determining a second expected improvement in the first probability value associated with the second algorithm;

selecting the first algorithm based at least in part on the first expected improvement and the second expected improvement;
determining, using the first algorithm, a third hypothesis associated with the first event, wherein determining the third hypothesis includes:
identifying a third event occurring during the time period that is related to the first event; and
determining an overall result of at least the first event and third event;
based at least in part on the third hypothesis of the first event, determining a second listing of items taken by the one or more users during the time period;
determining a second probability value indicating a second estimation of accuracy associated with the second listing of items;
determining that the second probability value is greater than or equal to the threshold; and
based at least in part on the second probability value being greater than or equal to the threshold, storing an association between the second listing of items and an account of the one or more users.

6. The method of claim 5, wherein the first probability value indicates a first likelihood that the first quantity of the first item was taken by the one or more users, further comprising:
determining a second probability value indicating a second likelihood that the second quantity of the first item was taken by the one or more users,
wherein the first listing of items further includes the first probability value and the second probability value.

7. The method of claim 5, further comprising:
determining processing-cost data based at least in part on at least one of:
an amount of computing resources to use the first algorithm to analyze the first event;
a price associated with the first item;
an amount of time taken to use the first algorithm to analyze the first event; or
an expected improvement in the first probability value by using the first algorithm to analyze the first event; and
determining a value of the threshold based at least in part on the processing-cost data.

8. The method of claim 5, further comprising:
identifying, from the sensor data, a fourth event associated with the one more users removing a third item from an inventory location during the time period;
identifying, from the sensor data, a fifth event associated with the one more users returning the third item to the inventory location during the time period; and
determining, based at least in part on the fourth event and the fifth event, that the third item was left in the materials handling facility by the one or more users.

9. The method of claim 5, wherein first listing of items includes:
a third probability value indicating a first likelihood that the first quantity of the first item was taken by the one or more users;
a fourth probability value indicating a second likelihood that the second quantity of the first item was taken by the one or more users;
a fifth probability value indicating a third likelihood that a third quantity of the second item was taken by the one or more users; and a sixth probability value indicating a fourth likelihood that a fourth quantity of the second item was taken by the one or more users.

10. The method of claim 5, further comprising:
determining a first expected improvement in the first probability value associated with determining the third hypothesis associated with the first event; and
determining a second expected improvement associated with resolving the second event,
wherein determining the third hypothesis associated with the first event is based at least in part on the first expected improvement and second expected improvement.

11. The method of claim 5, further comprising:
determining a first amount of computing resources to use the first algorithm to resolve the first event;
determining a second amount of computing resources to use a second algorithm to resolve the first event;
determining that the first amount of computing resources is less than the second amount of computing resources; and
selecting the first algorithm rather than the second algorithm to resolve the first event.

12. The method of claim 5, further comprising:
determining a first amount of time to use the first algorithm to resolve the first event;
determining a second amount of time to use a second algorithm to resolve the first event;
determining that the first amount of time is less than the second amount of time; and
selecting the first algorithm rather than the second algorithm to resolve the first event.

13. A system comprising:
a camera configured to generate image data representing a first inventory location;
a weight sensor configured to generate weight data associated with the first inventory location;
one or more processors; and
one or more computer-readable media storing computer-executable instructions that, when executed, cause the one or more processors to:
determine, using the image data, a first hypothesis of a first event, the first event representing a first occurrence of a user handling a first item during a time period in a facility the first event being determined based at least in part on the image data representing the user handling the first item;
determine, using the weight data, a second hypothesis of a second event, the second event representing a second occurrence of the user handling a second item during the time period in the facility, the second event being determined based at least in part on a change in the weight data corresponding to a weight of the second item;
generate a first probabilistic listing of items taken by the user during the time period, the first probabilistic listing including:
a first probability value indicating a first likelihood that the first item was taken by the user from the facility; and
a second probability value indicating a second likelihood that the second item was taken by the user from the facility;
determine that at least one of the first probability value or the second probability value is less than a threshold;

determine that resolving the first event is more likely to increase an overall probability value for the first probabilistic listing of items than resolving the second event;

determine, using an algorithm, a third hypothesis of the first event associated with the first item, wherein to determine the third hypothesis includes:
  identifying a third event occurring during the time period that is related to the first event; and
  determining an overall result of at least the first event and third event;

based at least in part on the third hypothesis of the first event, generate a second probabilistic listing of items taken by the user during the time period;

determine that one or more probabilistic values included in the second probabilistic listing of items are greater than or equal to the threshold; and store an association between the second probabilistic listing of items and an account of the user.

14. The system of claim 13, wherein:
the first probability value indicates the first likelihood that a first quantity of the first item was taken by the user;
the second probability value indicates the second likelihood that a second quantity of the second item was taken by the user; and
the first probabilistic listing of items further includes:
  a third probabilistic value indicating a third likelihood that a third quantity of the first item was taken by the user; and
  a fourth probabilistic value indicating a fourth likelihood that a fourth quantity of the second item was taken by the user.

15. The system of claim 13, wherein the algorithm comprises a first algorithm, comprising further computer-executable instructions that, when executed, cause the one or more processors to:
  determine a first expected improvement in the at least one of the first probability value or the second probability value associated with using the first algorithm for the first event;
  determine a second expected improvement in the at least one of the first probability value or the second probability value associated with using a second algorithm for the first event; and
  select the first algorithm to determine the third hypothesis of the first event based at least in part on the first expected improvement and second expected improvement.

16. The system of claim 13, comprising further computer-executable instructions that, when executed, cause the one or more processors to:
  determine a first expected improvement associated with resolving the first event; and
  determine a second expected improvement associated with resolving the second event,
  wherein determining the third hypothesis of the first event is based at least in part on the first expected improvement and second expected improvement.

17. The system of claim 13, comprising further computer-executable instructions that, when executed, cause the one or more processors to:
  determine a first indication that the user entered the facility at a beginning of the time period; and
  determine a second indication that the user exited the facility at an end of the time period,
  wherein receiving at least one of the first hypothesis or the second hypothesis is performed subsequent to the end of the time period.

18. The system of claim 13, comprising further computer-executable instructions that, when executed, cause the one or more processors to:
  receive an indication of a fourth event associated with the user removing a third item from an inventory location during the time period;
  receive an indication of a fifth event associated with the user returning the third item to the inventory location during the time period; and
  determine, based at least in part on the fourth event and the fifth event, that the third item was left in the facility by the user.

* * * * *